(12) United States Patent
Hoeger et al.

(10) Patent No.: US 12,059,758 B2
(45) Date of Patent: Aug. 13, 2024

(54) METHODS AND SYSTEMS FOR GAS CONTROL DURING WELDING WIRE PRETREATMENTS

(71) Applicant: Illinois Tool Works Inc., Glenview, IL (US)

(72) Inventors: Michael V. Hoeger, Appleton, WI (US); Joseph C. Schneider, Greenville, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/240,326

(22) Filed: Aug. 30, 2023

(65) Prior Publication Data

US 2023/0405703 A1 Dec. 21, 2023

Related U.S. Application Data

(63) Continuation of application No. 16/723,524, filed on Dec. 20, 2019, now Pat. No. 11,772,182.

(51) Int. Cl.
*B23K 9/29* (2006.01)
*B23K 9/10* (2006.01)
*B23K 9/16* (2006.01)

(52) U.S. Cl.
CPC ............ *B23K 9/295* (2013.01); *B23K 9/1093* (2013.01); *B23K 9/164* (2013.01)

(58) Field of Classification Search
CPC ....... B23K 9/295; B23K 9/1093; B23K 9/164
USPC ................................................... 219/121.11
See application file for complete search history.

(56) References Cited

U.S. PATENT DOCUMENTS

| | | | |
|---|---|---|---|
| 2,365,958 | A | 12/1944 | Holslag |
| 2,416,047 | A | 2/1947 | Dolan |
| 2,836,701 | A | 5/1958 | Bernard |
| 2,976,462 | A | 3/1961 | Miller |

(Continued)

FOREIGN PATENT DOCUMENTS

| | | |
|---|---|---|
| AT | 413801 | 6/2006 |
| CA | 2072711 | 12/1992 |

(Continued)

OTHER PUBLICATIONS

"ALT 304," Miller—The Power of Blue, Jun. 2001.

(Continued)

*Primary Examiner* — Nathaniel E Wiehe
*Assistant Examiner* — Thomas J Ward
(74) *Attorney, Agent, or Firm* — McAndrews, Held & Malloy, Ltd.

(57) ABSTRACT

The present disclosure is directed to systems and methods for pretreating a wire that is used in a welding operation to reduce the amount of hydrogen introduced into a weld. Using embodiments of the systems and methods disclosed herein, one passes a wire through a pre-treatment chamber in which a wire is treated to release hydrogen and/or other contaminants, and provides a gas flow through the pre-treatment chamber so that the contaminants that are released from the wire are taken up by the gas. The gas exiting the pre-treatment chamber may be isolated from the shielding gas utilized during a welding operation. For instance, the pretreatment gas may be directed away from the distal end of the welding torch, thereby preventing released contaminants from being transported into a weld.

10 Claims, 10 Drawing Sheets

(56) References Cited

U.S. PATENT DOCUMENTS

| | | |
|---|---|---|
| 3,030,495 A | 4/1962 | Anderson |
| 3,288,982 A | 11/1966 | Haruyoshi |
| 3,549,857 A | 12/1970 | Carter |
| 3,725,629 A | 4/1973 | Vickers |
| 3,809,853 A | 5/1974 | Manz |
| 3,849,871 A | 11/1974 | Kaunitz |
| 3,912,980 A | 10/1975 | Crump |
| 3,946,349 A | 3/1976 | Haldeman |
| 4,160,967 A | 7/1979 | Beech |
| 4,188,419 A | 2/1980 | Detert |
| 4,222,023 A | 9/1980 | Beech |
| 4,329,561 A | 5/1982 | Schafer |
| 4,426,565 A | 1/1984 | Rueter |
| 4,447,703 A | 5/1984 | Stol |
| 4,467,176 A | 8/1984 | Mizuno |
| 4,493,971 A | 1/1985 | Nawa |
| 4,531,040 A | 7/1985 | Nawa |
| 4,536,634 A | 8/1985 | Nawa |
| 4,546,234 A | 10/1985 | Ogasawara |
| 4,547,654 A | 10/1985 | Stol |
| 4,580,026 A | 4/1986 | Stol |
| 4,614,856 A | 9/1986 | Hori |
| 4,628,182 A | 12/1986 | Hori |
| 4,631,385 A | 12/1986 | Rothermel |
| 4,667,083 A | 5/1987 | Stol |
| 4,675,494 A | 6/1987 | Dilay |
| 4,728,761 A | 3/1988 | Mucha |
| 4,897,523 A | 1/1990 | Parks |
| 4,950,348 A | 8/1990 | Larsen |
| 4,954,691 A | 9/1990 | Parks |
| 4,973,821 A | 11/1990 | Martin |
| 5,043,557 A | 8/1991 | Tabata |
| 5,086,207 A | 2/1992 | Deam |
| 5,101,086 A | 3/1992 | Dion |
| 5,118,028 A | 6/1992 | Ogawa |
| 5,140,123 A | 8/1992 | Mitani |
| 5,148,001 A | 9/1992 | Stava |
| 5,208,433 A | 5/1993 | Hellegouarc |
| 5,270,516 A | 12/1993 | Hamamoto |
| 5,278,390 A | 1/1994 | Blankenship |
| 5,315,089 A | 5/1994 | Hughes |
| 5,319,179 A | 6/1994 | Joecks |
| 5,343,023 A | 8/1994 | Geissler |
| 5,349,156 A | 9/1994 | Madigan |
| 5,352,871 A | 10/1994 | Ross |
| 5,367,138 A | 11/1994 | Moss |
| 5,412,184 A | 5/1995 | McGaffigan |
| 5,461,215 A | 10/1995 | Haldeman |
| 5,466,916 A | 11/1995 | Iguchi |
| 5,504,309 A | 4/1996 | Geissler |
| 5,521,355 A | 5/1996 | Lorentzen |
| 5,526,561 A | 6/1996 | McGaffigan |
| 5,644,461 A | 7/1997 | Miller |
| 5,710,413 A | 1/1998 | King |
| 5,714,738 A | 2/1998 | Hauschulz |
| 5,739,506 A | 4/1998 | Hanton |
| 5,742,029 A | 4/1998 | Stava |
| 5,756,967 A | 5/1998 | Quinn et al. |
| 5,760,373 A | 6/1998 | Colling |
| 5,773,799 A | 6/1998 | Maxfield |
| 5,783,799 A | 7/1998 | Geissler |
| 5,832,765 A | 11/1998 | Ohashi |
| 5,844,193 A | 12/1998 | Nomura |
| 5,963,022 A | 10/1999 | Buda |
| 5,968,587 A | 10/1999 | Frankel |
| 5,994,659 A | 11/1999 | Offer |
| 6,002,104 A | 12/1999 | Hsu |
| 6,008,470 A | 12/1999 | Zhang |
| 6,043,471 A | 3/2000 | Wiseman |
| 6,051,810 A | 4/2000 | Stava |
| 6,077,369 A | 6/2000 | Kusano |
| 6,078,023 A | 6/2000 | Jones |
| 6,090,067 A | 7/2000 | Carter |
| 6,107,602 A | 8/2000 | Geissler |
| 6,115,273 A | 9/2000 | Geissler |
| 6,160,241 A | 12/2000 | Stava |
| 6,169,263 B1 | 1/2001 | Derby |
| 6,204,476 B1 | 3/2001 | Reynolds |
| 6,248,976 B1 | 6/2001 | Blankenship |
| 6,259,059 B1 | 7/2001 | Hsu |
| 6,265,688 B1 | 7/2001 | Lyshkow |
| 6,274,845 B1 | 8/2001 | Stava |
| 6,278,074 B1 | 8/2001 | Morlock |
| 6,292,715 B1 | 9/2001 | Rongo |
| 6,331,694 B1 | 12/2001 | Blankenship |
| 6,359,258 B1 | 3/2002 | Blankenship |
| 6,479,792 B1 | 11/2002 | Beiermann |
| 6,486,439 B1 | 11/2002 | Spear et al. |
| 6,515,259 B1 | 2/2003 | Hsu |
| 6,559,416 B1 | 5/2003 | Steenis |
| 6,583,386 B1 | 6/2003 | Ivkovich |
| 6,596,970 B2 | 7/2003 | Blankenship |
| 6,624,388 B1 | 9/2003 | Blankenship et al. |
| 6,642,482 B2 | 11/2003 | Rappl |
| 6,670,579 B2 | 12/2003 | Davidson et al. |
| 6,707,001 B1 | 3/2004 | Ulrich |
| 6,710,297 B1 | 3/2004 | Artelsmair |
| 6,720,529 B2 | 4/2004 | Davidson |
| 6,744,012 B2 | 6/2004 | Ueda |
| 6,747,247 B2 | 6/2004 | Holverson |
| 6,849,828 B2 | 2/2005 | Aigner |
| 6,906,284 B2 | 6/2005 | Kim |
| 6,909,067 B2 | 6/2005 | Davidson |
| 6,933,466 B2 | 8/2005 | Hutchison |
| 6,958,263 B2 | 10/2005 | Bhattacharyya |
| 6,974,931 B2 | 12/2005 | Holverson |
| 6,974,932 B2 | 12/2005 | Holverson |
| 6,995,338 B2 | 2/2006 | Hutchison |
| 7,002,103 B2 | 2/2006 | Holverson |
| 7,105,775 B2 | 9/2006 | Giese |
| 7,129,443 B2 | 10/2006 | Davidson |
| 7,145,101 B2 | 12/2006 | Tong |
| 7,244,905 B2 | 7/2007 | Das |
| 7,265,320 B2 | 9/2007 | Ou |
| 7,304,269 B2 | 12/2007 | Fulmer |
| 7,307,240 B2 | 12/2007 | Holverson |
| 7,351,933 B2 | 4/2008 | Huismann |
| 7,381,923 B2 | 6/2008 | Gordon et al. |
| 7,576,300 B2 | 8/2009 | Giese |
| 7,626,139 B2 | 12/2009 | Matsuguchi |
| 7,683,290 B2 | 3/2010 | Daniel |
| 8,203,100 B2 | 6/2012 | Ueda |
| 8,288,686 B2 | 10/2012 | Kaufman |
| 8,304,693 B2 | 11/2012 | Ma |
| 8,357,877 B2 | 1/2013 | Ma |
| 8,487,215 B2 | 7/2013 | Holverson |
| 8,604,388 B2 | 12/2013 | Dingeldein |
| 9,095,928 B2 | 8/2015 | Ash |
| 9,162,312 B2 | 10/2015 | Ma |
| 9,193,004 B2 | 11/2015 | Enyedy et al. |
| 9,193,005 B2 | 11/2015 | Ma |
| 9,233,432 B2 | 1/2016 | Zhang |
| 9,403,231 B2 | 8/2016 | Hutchison |
| 9,409,250 B2 | 8/2016 | Daniel |
| 9,463,523 B2 | 10/2016 | Roth |
| 9,539,662 B2 | 1/2017 | Hutchison |
| 9,669,486 B2 | 6/2017 | Dingeldein |
| 9,862,050 B2 | 1/2018 | Cole |
| 9,950,383 B2 | 4/2018 | Davidson |
| 2002/0008095 A1 | 1/2002 | Norrish |
| 2002/0045970 A1 | 4/2002 | Krause |
| 2002/0107825 A1 | 8/2002 | Manicke |
| 2002/0117487 A1 | 8/2002 | Corby |
| 2002/0117488 A1 | 8/2002 | Arndt |
| 2003/0010756 A1 | 1/2003 | Enyedy |
| 2003/0058149 A1 | 3/2003 | Jayadeva |
| 2004/0010342 A1 | 1/2004 | Thelen |
| 2004/0069759 A1 | 4/2004 | Davidson |
| 2004/0182828 A1 | 9/2004 | Schmidt |
| 2004/0222204 A1 | 11/2004 | Hutchison |
| 2004/0238511 A1 | 12/2004 | Matus |
| 2005/0072762 A1 | 4/2005 | Delgado |
| 2005/0082268 A1 | 4/2005 | Lajoie |
| 2005/0184039 A1 | 8/2005 | Stava |

(56) References Cited

U.S. PATENT DOCUMENTS

| | | |
|---|---|---|
| 2005/0218132 A1 | 10/2005 | Wells |
| 2005/0269306 A1 | 12/2005 | Fulmer |
| 2006/0138115 A1 | 6/2006 | Norrish |
| 2006/0163227 A1 | 7/2006 | Hillen |
| 2006/0163229 A1 | 7/2006 | Hutchison |
| 2007/0051711 A1 | 3/2007 | Kachline |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0053978 A1 | 3/2008 | Peters |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0039066 A1 | 2/2009 | Centner |
| 2009/0173726 A1 | 7/2009 | Davidson et al. |
| 2009/0215302 A1 | 8/2009 | Roberts |
| 2010/0012637 A1 | 1/2010 | Jaegar |
| 2010/0059493 A1 | 3/2010 | Mcaninch |
| 2010/0096373 A1 | 4/2010 | Hillen |
| 2010/0096436 A1 | 4/2010 | Nangle |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0204034 A1 | 8/2011 | Schartner |
| 2011/0204035 A1 | 8/2011 | Grossauer |
| 2011/0297658 A1 | 8/2011 | Peters |
| 2011/0248007 A1 | 10/2011 | Takeda |
| 2011/0266269 A1 | 11/2011 | Kachline |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0285932 A1 | 11/2012 | Yuan |
| 2012/0291172 A1 | 11/2012 | Wills |
| 2012/0298642 A1 | 11/2012 | Lambert |
| 2013/0112674 A1 | 5/2013 | Mnich |
| 2013/0112676 A1 | 5/2013 | Hutchison |
| 2013/0213942 A1 | 8/2013 | Peters |
| 2013/0264323 A1 | 10/2013 | Daniel |
| 2013/0270245 A1 | 10/2013 | Holverson |
| 2014/0008328 A1 | 1/2014 | Enyedy |
| 2014/0008331 A1 | 1/2014 | Ogborn |
| 2014/0008339 A1 | 1/2014 | Ogborn |
| 2014/0008343 A1 | 1/2014 | Ash |
| 2014/0008344 A1 | 1/2014 | Enyedy |
| 2014/0008354 A1 | 1/2014 | Pletcher |
| 2014/0021183 A1 | 1/2014 | Peters |
| 2014/0021186 A1 | 1/2014 | Denney |
| 2014/0021187 A1 | 1/2014 | Denney |
| 2014/0021188 A1 | 1/2014 | Denney |
| 2014/0034621 A1 | 2/2014 | Daniel |
| 2014/0034622 A1 | 2/2014 | Barrett |
| 2014/0035279 A1 | 2/2014 | Narayanan |
| 2014/0042129 A1 | 2/2014 | Daniel |
| 2014/0042138 A1 | 2/2014 | Matthews |
| 2014/0048524 A1 | 2/2014 | Ash |
| 2014/0116994 A1 | 5/2014 | Peters |
| 2014/0131321 A1 | 5/2014 | Enyedy |
| 2014/0158669 A1 | 6/2014 | Davidson |
| 2014/0177109 A1 | 6/2014 | Curtis |
| 2014/0183176 A1 | 7/2014 | Hutchison |
| 2014/0217077 A1 | 8/2014 | Davidson |
| 2014/0251971 A1 | 9/2014 | Hearn |
| 2014/0263193 A1 | 9/2014 | Denney |
| 2014/0263194 A1 | 9/2014 | Narayanan |
| 2014/0263228 A1 | 9/2014 | Peters |
| 2014/0263229 A1 | 9/2014 | Peters |
| 2014/0263230 A1 | 9/2014 | Peters |
| 2014/0263231 A1 | 9/2014 | Peters |
| 2014/0263234 A1 | 9/2014 | Peters |
| 2014/0263237 A1 | 9/2014 | Daniel |
| 2014/0263241 A1 | 9/2014 | Henry |
| 2014/0263243 A1 | 9/2014 | Marschke |
| 2014/0263251 A1 | 9/2014 | Enyedy |
| 2014/0319103 A1 | 10/2014 | Stabb et al. |
| 2014/0367370 A1 | 12/2014 | Hutchison |
| 2014/0374391 A1 | 12/2014 | Cole |
| 2015/0001184 A1 | 1/2015 | Cole |
| 2015/0001197 A1 | 1/2015 | Marschke |
| 2015/0014283 A1 | 1/2015 | Peters |
| 2015/0028010 A1 | 1/2015 | Peters |
| 2015/0028011 A1 | 1/2015 | Peters |
| 2015/0028012 A1 | 1/2015 | Peters |
| 2015/0083702 A1 | 3/2015 | Scott |
| 2015/0090703 A1 | 4/2015 | Peters |
| 2015/0105898 A1 | 4/2015 | Adams |
| 2015/0151375 A1 | 6/2015 | Peters |
| 2015/0158105 A1 | 6/2015 | Peters |
| 2015/0158106 A1 | 6/2015 | Peters |
| 2015/0158107 A1 | 6/2015 | Latessa |
| 2015/0158108 A1 | 6/2015 | Peters |
| 2015/0183044 A1 | 7/2015 | Peters |
| 2015/0183045 A1 | 7/2015 | Peters |
| 2015/0209889 A1 | 7/2015 | Peters |
| 2015/0209905 A1 | 7/2015 | Matthews |
| 2015/0209906 A1 | 7/2015 | Denney et al. |
| 2015/0209907 A1 | 7/2015 | Narayanan |
| 2015/0209908 A1 | 7/2015 | Peters |
| 2015/0209910 A1 | 7/2015 | Denney |
| 2015/0209913 A1 | 7/2015 | Denney |
| 2015/0213921 A1 | 7/2015 | Koide |
| 2015/0251275 A1 | 9/2015 | Denney et al. |
| 2015/0273612 A1 | 10/2015 | Peters |
| 2015/0283638 A1 | 10/2015 | Henry |
| 2015/0283639 A1 | 10/2015 | Henry |
| 2016/0074973 A1 | 3/2016 | Kachline |
| 2016/0144444 A1 | 5/2016 | Davidson |
| 2016/0167151 A1 | 6/2016 | Mehn |
| 2016/0175975 A1 | 6/2016 | Lattner |
| 2016/0199939 A1 | 7/2016 | Hartman |
| 2016/0221105 A1 | 8/2016 | Henry et al. |
| 2016/0288235 A1 | 10/2016 | Davidson |
| 2016/0318112 A1 | 11/2016 | Hutchison |
| 2017/0080512 A1 | 3/2017 | Centner |
| 2017/0165778 A1 | 6/2017 | Hsu |
| 2017/0225255 A1 | 8/2017 | Zwayer |
| 2018/0099346 A1 | 4/2018 | Zwayer |
| 2018/0236585 A1 | 8/2018 | Davidson |
| 2018/0354057 A1 | 12/2018 | Sigl |

FOREIGN PATENT DOCUMENTS

| | | |
|---|---|---|
| CA | 2883947 | 3/2014 |
| CN | 2125475 | 12/1992 |
| CN | 2181354 | 11/1994 |
| CN | 1298778 | 6/2001 |
| CN | 1496774 | 5/2004 |
| CN | 1593830 | 3/2005 |
| CN | 1600486 | 3/2005 |
| CN | 1640603 | 7/2005 |
| CN | 1686656 | 10/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 201249331 | 6/2009 |
| CN | 101804495 | 8/2010 |
| CN | 101862886 | 10/2010 |
| CN | 102000903 | 4/2011 |
| CN | 102059476 | 5/2011 |
| CN | 102470473 | 5/2012 |
| CN | 102528243 | 7/2012 |

(56) References Cited

FOREIGN PATENT DOCUMENTS

| | | |
|---|---|---|
| CN | 102554418 | 7/2012 |
| CN | 102596475 | 7/2012 |
| CN | 102770228 | 11/2012 |
| CN | 102825370 | 12/2012 |
| CN | 202824943 | 3/2013 |
| CN | 104968465 | 10/2015 |
| CN | 108581156 | 9/2018 |
| DE | 2501928 | 7/1976 |
| DE | 19808383 | 9/1999 |
| DE | 212004000048 | 6/2006 |
| EP | 0150543 | 8/1985 |
| EP | 0194045 | 9/1986 |
| EP | 0204559 | 12/1986 |
| EP | 0387223 | 9/1990 |
| EP | 0936019 A2 | 8/1999 |
| EP | 0936019 A3 | 3/2001 |
| EP | 1232825 | 8/2002 |
| EP | 2218537 | 8/2010 |
| EP | 2286949 | 2/2011 |
| EP | 2322315 | 5/2011 |
| EP | 2522453 | 11/2012 |
| EP | 2892680 | 7/2015 |
| EP | 2781291 | 10/2015 |
| EP | 3265263 A1 | 1/2018 |
| FR | 1443701 | 6/1966 |
| JP | S5719166 | 2/1982 |
| JP | S57109573 | 7/1982 |
| JP | S583784 | 1/1983 |
| JP | S58119466 | 7/1983 |
| JP | S60108175 | 6/1985 |
| JP | S60108176 | 6/1985 |
| JP | S60130475 | 7/1985 |
| JP | S60170577 | 9/1985 |
| JP | S61186172 | 8/1986 |
| JP | S629773 | 1/1987 |
| JP | S6471575 | 3/1989 |
| JP | H03285768 | 12/1991 |
| JP | H06277840 | 10/1994 |
| JP | H07204848 | 8/1995 |
| JP | H1097327 | 4/1998 |
| JP | H11156542 | 6/1999 |
| JP | 2001276971 | 10/2001 |
| JP | 2003205385 | 7/2003 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| JP | 2014176890 | 9/2014 |
| KR | 1020060133016 | 12/2006 |
| KR | 20080009816 | 1/2008 |
| KR | 20100120562 | 11/2010 |
| KR | 1020120027764 | 3/2012 |
| KR | 101497460 | 3/2015 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |
| WO | 2014140783 | 9/2014 |
| WO | 2015125008 | 8/2015 |

OTHER PUBLICATIONS

"Maxstar 200 SD, DX, and LX," Miller Electric Mfg. Co., Oct. 2003.

Bondy et al., "Graph Theory with Applications," Department of Combinatorics and Optimization, University of Waterloo, 1976, p. 7-8.

Gupta, "A low temperature hydrogen sensor based on palladium nanoparticles," Published in 2014.

Lincoln Electric, "Storing and Redrying Electrodes," Published in 2011.

N.A.: "Drahtgluhe", Aug. 23, 2016 (Aug. 23, 2016), XP055510057, Wikipedia, Retrieved from the Internet: URL:https://de.wikipedia.Org/w/index.php?title=Drahtgl%C3%BChe&oldid=157333005, [retrieved on Sep. 26, 2018], with machine translation, 2 pages.

Ni, Jun, Effect of the Wire Temperature on the Weld Fomation in GMAW, Advanced Materials Research, ISSN: 1662-8985, vols. 652-654, pp. 2289-2292, doi: 10.4028/www.scientific.net/AMR.652-654.2289, Trans Tech Publications, Switzerland, Online: Jan. 25, 2013 (4 pages).

Ni, Jun, Influence of Preheated Wire on GMAW Process, Advanced Materials Research, ISSN: 1662-8985, vol. 668, pp. 538-542, doi: 10.4028/www.scientific.net/AMR.668.538, Trans Tech Publications, Switzerland, Online: Mar. 11, 2013 (5 pages).

Pitrun, "The effect of welding parameters on levels of diffusible hydrogen in weld metal deposited using gas shield rutile flux cored wires," Published in 2004.

Non-Final Office Action AppIn No. U.S. Appl. No. 15/343,992 dated Mar. 7, 2019 (18 pgs.).

Int'l Search Report and Written Opinion AppIn No. PCT/U2019/067491 mailed Jun. 25, 2020.

Extended European Search Report for European Patent Application No. 20213478.9, dated May 25, 2021 (7pages).

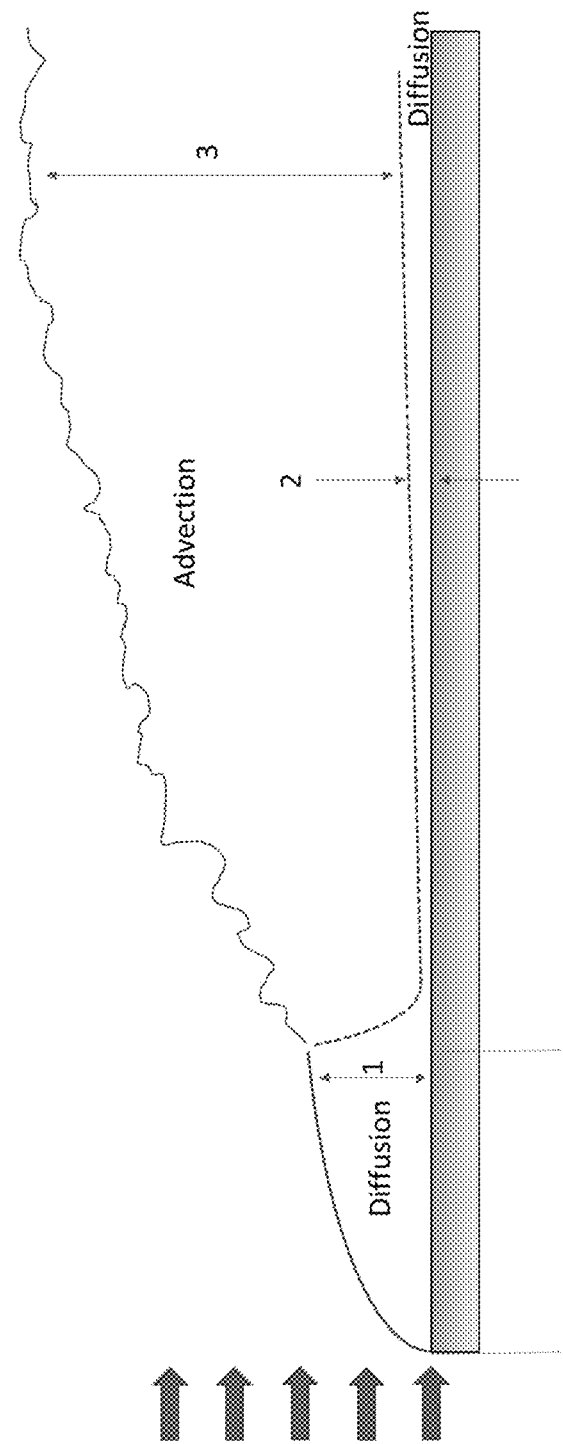

METHODS AND SYSTEMS FOR GAS CONTROL DURING WELDING WIRE PRETREATMENTS

This application is a continuation of U.S. patent application Ser. No. 16/723,524, filed on Dec. 20, 2019, the entirety of which is incorporated by reference herein.

BACKGROUND

This disclosure relates generally to welding and, more particularly, to methods, systems, and apparatuses for pre-treating a wire of a welding implement to reduce the amount of hydrogen in solidified welds and to make such welds less susceptible to hydrogen induced cracking (HIC) and hydrogen embrittlement. More specifically, this disclosure relates to methods, systems, and apparatuses for controlling and utilizing gas flow during such pre-treating operations.

Welding is a process that has increasingly become ubiquitous in all industries. Welding is, at its core, simply a way of bonding two pieces of metal. A wide range of welding systems and welding control regimes have been implemented for various purposes. In continuous welding operations, metal inert gas (MIG) welding and submerged arc welding (SAW) techniques allow for formation of a continuing weld bead by feeding welding electrode wire shielded by inert gas from a welding torch and/or by flux. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

SUMMARY

The present disclosure relates to a wire pretreating system, method, and apparatuses for use with a welding torch, more particularly, to systems, methods and apparatuses to pretreat welding wire for low hydrogen welding.

Embodiments of the present disclosure are directed to a welding system comprising a torch having a distal end, through which a filler wire extends. The filler wire passes into and through the torch in a downstream direction toward the distal end. As the filler wire passes from a spool into and through the torch, it passes through a pre-treatment, or cleaning, chamber and a shielding gas chamber. At a given time during a welding operation, the pre-treatment chamber surrounds at least a portion of the wire and the shielding gas chamber surrounds at least a portion of the wire. The shielding gas chamber has a gas inlet and a gas outlet. The outlet of the shielding gas chamber is configured such that the shielding gas exiting the shielding gas chamber flows around the portion of the wire that extends from the distal end of the torch. For instance, the outlet of the shielding gas chamber may generally correspond with the distal end of the torch. The pre-treatment chamber also comprises a gas inlet and a gas outlet. The gas outlet of the pre-treatment chamber, however, is isolated from the shielding gas chamber.

For example, in some embodiments, the gas outlet of the pre-treating chamber may be configured so that the gas exiting the pre-treatment chamber is directed away from the weld pool, i.e. away from the portion of the wire extending from the distal end of the torch. This may involve venting the gas from the pre-treatment chamber to the atmosphere at a distance from the distal end of the torch and in a direction different from the downstream flow direction of the shielding gas. Alternatively, the gas exiting the pre-treatment chamber may be transported to a collection unit, recycled, or the like.

In some embodiments, the gas outlet of the pre-treatment chamber is isolated from the shielding gas chamber by the pre-treatment chamber being at least partially nested within at least a portion of the shielding gas chamber. In such embodiments, the gas outlet of the pre-treating chamber may include one or more bypass ducts extending through the shielding gas chamber. In this way, the spent pre-treatment gas may be transported through the shielding gas chamber without the spent pre-treatment gas mixing with the shielding gas. In other embodiments, the gas outlet of the pre-treatment chamber is isolated from the shielding gas chamber by the pre-treatment chamber being positioned upstream of the shielding gas chamber. The downstream end of the pre-treatment chamber may be separated from the upstream end of the shielding gas chamber by one or more baffles and/or by any other equipment which may serve to fluidly isolate the two chambers.

In some embodiments, the pre-treatment chamber and the shielding gas chamber may both be positioned within a body of the torch. In other embodiments, only a portion of the pre-treatment chamber may be positioned within a body of the torch. In yet other embodiments, the pre-treatment chamber may be positioned upstream from the body of the torch.

In some embodiments, the gas inlet of the pre-treatment chamber and the inlet of the shielding gas chamber may be operatively connected, e.g. fluidly connected, such that a gas line attached to a single connection port can supply gas to both chambers. In this way, a single gas supply may be used as both the pre-treatment gas and the shielding gas. In some embodiments, the gas inlet of the pre-treatment chamber and the inlet of the shielding gas chamber may be distinct from one another, such that the gas supplied to the pre-treatment chamber may be of a different composition than the gas supplied to the shielding gas chamber. For example, the gas inlet of the pre-treatment chamber may be configured to be connected to a first gas line and the inlet of the shielding gas chamber may be configured to be connected to a second gas line. In some embodiments, the system may be configured so that a user may select whether to use a single gas attachment or two separate gas attachments.

In some embodiments, the pre-treatment chamber may be configured to resistively pre-heat an electrode wire, such as through a wire pre-heating circuit. The wire pre-heating circuit may comprise a first contact tip, a second contact tip, and a section of the electrode wire between the first and second contact tips. In some embodiments, the pre-treatment chamber may be configured to etch a filler wire, such as an aluminum wire. For instance, the pre-treatment chamber may comprise one or more electrodes, e.g. tungsten electrodes, arranged and configured to etch a surface layer of the filler wire.

Embodiments of the present disclosure are also directed to methods of pre-treating a wire of a welding device to reduce the amount of hydrogen introduced into a weld. The method includes passing a wire through a pre-treatment chamber which has a gas inlet and a gas outlet, providing a gas flow through the pre-treatment chamber between the gas inlet and the gas outlet, and pre-treating the wire, e.g. by pre-heating and/or etching, to release hydrogen and/or other contaminants from the wire. By providing gas flow around the wire during the pre-treatment, the hydrogen and/or other contaminants that are removed from the wire may be taken up by the gas. The gas exiting the outlet of the pre-treatment chamber may be isolated from the shielding gas that is utilized during a welding operation. Further, the gas exiting the outlet of the pre-treatment chamber may be directed away from the welding operation, i.e. away from the portion of wire extending from the distal end of the torch. This may involve venting the gas from the pre-treatment chamber to the atmosphere at a distance from the distal end of the torch and/or in a direction different from the downstream flow direction of the shielding gas. Alternatively, the gas exiting the pre-treatment chamber may not be vented, but rather transported to a collection unit, recycled, or the like.

In some embodiments, the pre-treating of the wire involves pre-heating the wire to remove hydrogen and/or other contaminants. The pre-heating may involve a resistive pre-heating, in which a wire pre-heating circuit is created. The wire pre-heating circuit may include the connection of first and second contact tips to the wire in a spaced apart relationship. In some embodiments, the pre-treating of the wire involves etching the surface of a wire, e.g. etching the surface of an aluminum wire, to remove hydrogen and/or other contaminants. The etching may involve the use of one or more electrodes, e.g. tungsten electrodes.

In some embodiments, the gas that flows through the pre-treatment chamber may be the same gas that is used as a shielding gas for the welding operation. In other embodiments, however, the gas that flows through the pre-treatment chamber may be compositionally distinct from the gas that is used as a shielding gas for the welding operation. For instance, a first gas may be used as the shielding gas for a welding operation and a second gas, having a different composition than the first gas, may be used as a pre-treatment gas.

Embodiments of the present disclosure are also directed to methods of removing hydrogen from a filler wire that is utilized in a welding operation by passing the wire through a pre-treatment, or cleaning, chamber which comprises a gas inlet and a gas outlet, preferably a gas outlet that isolates the gas being discharged from the pre-treatment chamber from the shielding gas that is utilized in the welding operation; treating the wire within the pre-treatment chamber to release hydrogen and/or other contaminants, and creating a turbulent flow of gas through the pre-treatment chamber. By creating a turbulent flow of gas within the pre-treatment chamber, it has presently been found that the transportation of the released hydrogen and/or other contaminants away from the wire may be made more efficient, resulting in less contamination being reintroduced onto the wire or otherwise transported into a welding zone.

In some embodiments, the gas flowing through the pre-treatment chamber may be caused to have a Reynolds number of at least 2100, alternatively at least 2500, alternatively at least 2800, alternatively at least 3000, alternatively at least 3500, alternatively at least 4000. The gas flowing through the pre-treatment chamber may be acted upon in order to bring about a desired degree of turbulence by in any number of ways, including for example impinging the flow of gas at or near a gas inlet of the pre-treatment chamber, such as by flowing the gas through an area of decreased cross-section, placing one or more obstructions within the flow-path of the gas, passing the gas past one or more roughened or textured surfaces, or the like.

In some embodiments, the treating of the wire involves pre-heating the wire to remove hydrogen and/or other contaminants. The pre-heating may involve a resistive pre-heating, in which a wire pre-heating circuit is created. The wire pre-heating circuit may include the connection of first and second contact tips to the wire in a spaced apart relationship. In some embodiments, the treating of the wire involves etching the surface of a wire, e.g. etching the surface of an aluminum wire, to remove hydrogen and/or other contaminants. The etching may involve the use of one or more electrodes, e.g. tungsten electrodes.

Embodiments of the present disclosure are also directed to a welding system comprising a filler wire and a pre-treatment chamber surrounding at least a portion of the wire, in which the pre-treatment chamber comprises a gas inlet and a gas outlet, preferably a gas outlet that is isolated from a shielding gas chamber, and one or more flow impingers that are configured to create turbulent gas flow within the pre-treatment chamber. The one or more flow impingers may include, for example, an area of decreased cross-section, one or more obstructions within the flow-path of the gas, one or more roughened or textured surfaces, or the like.

In some embodiments, the pre-treatment chamber may both be positioned within a body of the torch. In other embodiments, only a portion of the pre-treatment chamber may be positioned within a body of the torch. In yet other embodiments, the pre-treatment chamber may be positioned upstream from the body of the torch. The gas outlet of the pre-treatment chamber may be configured to direct the gas exiting the pre-treatment chamber away from a welding operation, e.g. away from a distal end of a welding torch.

In some embodiments, the pre-treatment chamber may be configured to resistively pre-heat an electrode wire, such as through a wire pre-heating circuit. The wire pre-heating circuit may comprise a first contact tip, a second contact tip, and a section of the electrode wire between the first and second contact tips. In some embodiments, the pre-treatment chamber may be configured to etch a filler wire, such as an aluminum wire. For instance, the pre-treatment chamber may comprise one or more electrodes, e.g. tungsten electrodes, arranged and configured to etch a surface layer of the filler wire.

Embodiments of the present disclosure are also directed to a method of performing a welding operation utilizing the systems and/or methods disclosed herein.

BRIEF DESCRIPTION OF THE DRAWINGS

The following is a description of the examples depicted in the accompanying drawings. The figures are not necessarily to scale, and certain features and certain views of the figures may be shown exaggerated in scale or in schematic in the interest of clarity or conciseness.

FIG. 10 illustrates the differing mechanisms of transport associated with the flow conditions shown in FIG. 9.

The figures are not necessarily to scale. Where appropriate, similar or identical reference numbers are used to refer to similar or identical features.

DETAILED DESCRIPTION

Figure 1:
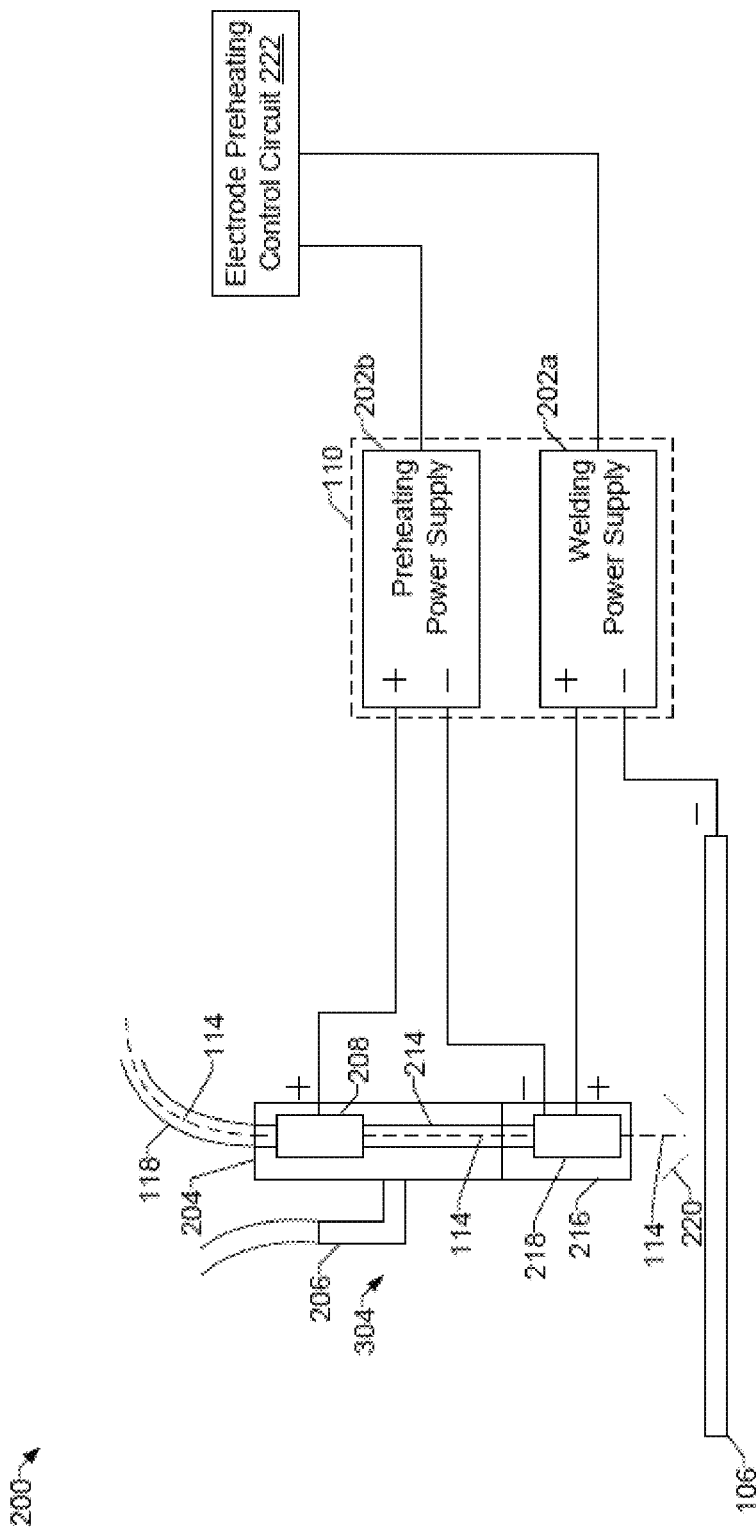
FIG. 1 illustrates an embodiment of a system for pre-heating a welding wire.

In the following detailed description, specific details may be set forth in order to provide a thorough understanding of embodiments of the present disclosure. However, it will be clear to one skilled in the art when disclosed examples may be practiced without some or all of these specific details. For the sake of brevity, well-known features or processes may not be described in detail. In addition, like or identical reference numerals may be used to identify common or similar elements.

Hydrogen embrittlement is a process by which metals lose toughness, become brittle, and/or fracture due to the presence and diffusion of hydrogen. The pressure on the workpiece, caused at least in part by hydrogen introduced by a filler wire such as welding electrodes, can build up. When the pressure exceeds a threshold level, the workpiece can crack in a mechanism referred to as hydrogen-induced cracking. Through the process of welding, metals can pick up hydrogen through the usage of welding filler materials which have been exposed to moisture and/or otherwise forming hydrocarbons.

Tubular welding wire generally provide more difficulties than solid welding wire in controlling the level of moisture during manufacture, and may have more tendency to pick up moisture during storage and/or field use. When welding with seamed wire, an operator and/or other material handling personnel must take extra care to avoid submitting filler material to sources which can increase risk of hydrogen cracking. Common seamed wires which are often used in applications such as shipbuilding, pipelines, and/or structural welding, which can be susceptible to hydrogen cracking, include FabCO XL550 (E71T-1CJ/-9CJ/-12CJ H4), Fabshield 81N1 (E71T8-Ni1 J H8), and FabCOR 86R (E70C-6M H4).

Aluminum welding wire is highly reactive, and forms a surface oxide layer when exposed to atmospheric conditions. The oxide layer contains significant amounts of water from atmospheric humidity. The water provides a source of hydrogen, which can cause porosity in an aluminum weld.

The welding systems described herein may form a weld (e.g., at a weld joint) between two components in a weldment by any known electric welding techniques. Known electric welding techniques include, inter alia, shielded metal arc welding (SMAW), MIG, flux-cored arc welding (FCAW), TIG, laser welding, sub-arc welding (SAW), stud welding, friction stir welding, and resistance welding. MIG, TIG, hot wire cladding, hot wire TIG, hot wire brazing, multiple arc applications, and SAW welding techniques, inter alia, may involve automated or semi-automated external metal filler (e.g., via a wire feeder). Optionally, in any embodiment, the welding equipment may be arc welding equipment having one or more power supplies, and associated circuitry, that provides a direct current (DC), alternating current (AC), or a combination thereof to an electrode wire of a welding tool. The welding tool may be, for example, a TIG torch, a MIG torch, or a flux cored torch (commonly called a MIG "gun"). The electrode wire may be tubular-type electrode, a solid type wire, a flux-core wire, a seamless metal core wire, and/or any other type of electrode wire.

As used herein, a wire-fed welding system refers to a system capable of performing welding (e.g., gas metal arc welding (GMAW), gas tungsten arc welding (GTAW), submerged arc welding (SAW), etc.), brazing, cladding, hardfacing, and/or other processes, in which a filler metal is provided by a wire that is fed to a work location, such as an arc or weld puddle.

Embodiments of the present disclosure are directed to pretreatment of a welding wire, i.e., treatment of a filler wire in the travel path of the wire and prior to a welding arc and/or deposition. The pretreatment may include preheating, etching, or a combination thereof. As used herein, preheating refers to heating a wire prior to a welding arc and/or deposition. As used herein, etching refers to the removal of a surface layer of a wire, e.g. the removal of an oxide layer of an aluminum wire. The pretreatment may take place within a welding tool itself, e.g. within a torch or gun, or within a separate component, e.g. within a component that is independent of the welding tool. Because the pretreatment releases hydrogen from the wire, the pretreatment takes place in what is referred to herein as a cleaning chamber or a pre-cleaning chamber.

Resistive Pre-Heating Methods and Systems

Disclosed examples involve resistively preheating the electrode wire after unwinding from the wire spool and prior to the arc. For example, the electrode wire may be preheated via contact points located at any two points between the wire source and the arc. The contact points may be implemented using any technique to establish electrical contact with the electrode wire, such as contact tips, conductive brushes, and/or conductive rollers. Some other disclosed examples involve resistively preheating the wire during the wire drawing (e.g., manufacturing) process to immediately reduce the hydrogen in the drawn wire. Disclosed examples therefore are capable of delivering wire to welding applications that substantially reduce risks of cracking and embrittlement in welds that use the preheated wire.

Disclosed examples include one or more preheating circuits in addition to a welding circuit, which are controlled to provide current to preheat the electrode. Preheating a welding electrode provides a number of potential benefits, which are described in U.S. patent application Ser. No. 15/343,992, filed Nov. 4, 2016, and entitled "Systems, Methods, and Apparatus to Preheat Welding Wire." The entirety of U.S. patent application Ser. No. 15/343,992 is incorporated herein by reference. In addition to provide such benefits, disclosed examples use one or more preheating circuits to reduce the hydrogen content in a welding wire by increasing the rate of hydrogen diffusion from the wire.

In some examples, the preheating circuit includes multiple contact points (e.g., welding torch contact tips, and/or other contact points), which may be positioned in contact with the electrode wire at the welding torch, at a wire feeder, between the wire feeder and the welding torch, and/or any combination of the welding torch, the wire feeder, or between the welding torch and the wire feeder. In some examples, a welding system includes multiple preheating circuits. Different preheating circuits may provide different levels of preheating current. For example, the electrode wire fed from a wire spool may be provided with a first, low preheating current to increase the temperature of the wire to encourage hydrogen diffusion, while maintaining sufficient column strength for feeding the wire without buckling. When the wire approaches the torch, a higher preheating current is applied to increase the wire temperature closer to a melting point of the wire. The currents applied by each of the preheating circuits may be superimposed (e.g., additive or subtractive) in section(s) of the electrode wire, superimposed (e.g., additive or subtractive) at one or more contact tips or other contact points, or non-overlapping. Additionally or alternatively, the welding current may be superimposed on one or more preheating currents and/or non-overlapping with the preheating current(s).

Disclosed examples control the preheating current in the wire via control loops (e.g., voltage-controlled loops, current-controlled loops, etc.) to reduce the level of hydrogen in a consistent manner over a relatively short period of time compared to conventional baking and compared to conventional extended stickout techniques. In some examples, the preheating current is controlled based on aspects of the wire such as wire type, wire composition, and/or wire diameter, a length of the wire path from the wire feeder to the arc, wire feed speed, and/or any other control variables affecting hydrogen diffusion. A look-up table can be implemented to recall optimum preheat parameters for certain types of tubular wire and wire feed rate.

In some examples, a hydrogen sensor may be added to monitor the level of hydrogen. For example, Palladium (Pd) based (e.g., Pd-functionalized) carbon nanotube (CNT), a diode-based Schottky sensor with Pd-alloy gate, and/or a highly-ordered vertically oriented titanium dioxide (TiO2) nanotube microelectromechanical systems (MEMS) sensors can be incorporated in the welding torch to detect hydrogen levels and/or perform closed loop control of the preheat power source. A hydrogen sensor may also be placed near the preheat chamber as a measure of hydrogen level before depositing the consumable electrode into weld pool to form the weld metal.

Disclosed example apparatus to reduce hydrogen associated with a consumable welding electrode include: a welding-type power source configured to provide welding-type current to a welding-type circuit, in which the welding-type circuit includes a welding-type electrode and a first contact point of a welding torch; and an electrode preheating circuit configured to supply preheating current through a first portion of the welding-type electrode, in which the first portion of the welding-type electrode is located between a wire source supplying the welding-type electrode and the first contact point of the welding torch.

Some example apparatus further include an electrode preheating control circuit configured to control the preheating current based on at least one of a type of the welding-type electrode, a chemistry of the welding-type electrode, a wire diameter, or a gas composition. Some example apparatus further include a hydrogen sensor configured to measure hydrogen at least one of in the welding-type electrode or proximate the welding-type electrode, in which the electrode preheating control circuit is configured to control the preheating current based on a hydrogen measurement from the hydrogen sensor. In some examples, the hydrogen sensor is at least one of a Palladium-based sensor, a diode-based Schottky sensor, or a micromechanical systems-based sensor.

Some example apparatus further include a moisture sensor configured to measure moisture at least one of in the welding-type electrode or proximate the welding-type electrode, in which the electrode preheating control circuit is configured to control the preheating current based on a moisture measurement from the moisture sensor. In some examples, the electrode preheating circuit is configured to provide the preheating current to the electrode preheating circuit via the first contact point and a second contact point. In some examples, the preheating current and the welding-type current have respective polarities that reduce a net current at the second contact point to less than the preheating current and the welding-type current.

Some example apparatus further include a wire cooler configured to cool the welding-type electrode following heating of the welding-type electrode. Some example apparatus further include an electrode preheating control circuit configured to control the preheating current to achieve at least one of a target current, a target voltage, a target power, a target resistance, a target temperature, or a target enthalpy in the welding-type electrode. In some examples, the welding torch includes a vent system to remove hydrogen from a volume proximate the welding-type electrode conducting the preheating current.

In some examples, the electrode preheating circuit includes a second contact point located between the first contact point and the wire source. In some such examples, the second contact point is a drive roll of a wire feeder. In some examples, the second contact point comprises a second contact tip in the welding torch. In some examples, the electrode preheating circuit includes the first contact point and the second contact point. In some examples, the electrode preheating circuit includes a third contact point located between the first contact point and the second contact point.

Disclosed example methods to reduce hydrogen in a welding-type electrode include: providing, via a welding-type power source, welding-type current to a welding-type circuit, in which the welding-type circuit includes a welding-type electrode and a first contact point of a welding torch; and supplying, via an electrode preheating circuit, preheating current through a first portion of the welding-type electrode between a wire source of the welding-type electrode and the first contact point of the welding torch.

FIG. 1 illustrates a functional diagram of an exemplary welding system 200 having a resistive pre-heat. As illustrated, the welding system 200 may comprise a torch body 204, a shielding gas inlet 206, a first contact tip 218, a ceramic guide 214, a gas nozzle 216, and a second contact tip 208.

In some examples, the first contact tip 218 and/or the second contact tip 208 are modular and/or removable so as to be easily serviceable by a user of the welding system 200. For example, the first contact tip 218 and/or the second contact tip 208 may be implemented as replaceable cartridges. In some examples, the welding equipment 110 monitors and indicates that the first contact tip 218 and/or the second contact tip 208 should be replaced, taking into account, for instance, measurements of the used time of the first contact tip 218 and/or the second contact tip 208, temperature(s) of the first contact tip 218 and/or the second contact tip 208, amperage in the first contact tip 218 and/or the second contact tip 208 and/or the wire, voltage between the first contact tip 218 and/or the second contact tip 208 and/or the wire, enthalpy in the wire, and/or any other data.

In operation, the electrode wire 114 passes into the body of the torch 204 through a first contact tip 218 and a second contact tip 208, between which a second power supply 202b generates a preheat current to heat the electrode wire 114. Specifically, the preheat current may enter the electrode wire 114 via the second contact tip 208 and exit via the first contact tip 218. At the first contact tip 218, a welding current may also enter the electrode wire 114. The welding current is generated, or otherwise provided by, a first power supply 202a. The welding current exits the electrode wire 114 via the workpiece 106, which in turn generates the welding arc 220. That is, the electrode wire 114, when energized for welding via a welding current, carries a high electrical potential. When the electrode wire 114 makes contact with a target metal workpiece 106, an electrical circuit is completed and the welding current flows through the electrode wire 114, across the metal work piece(s) 106, and to ground. The welding current causes the electrode wire 114 and the parent metal of the work piece(s) 106 in contact with the electrode wire 114 to melt, thereby joining the work pieces as the melt solidifies. By preheating the electrode wire 114, a welding arc 220 may be generated with drastically reduced arc energy.

The preheat current can range from, for example, 25 A to 400 A. Generally speaking, the preheat current is inversely proportional to the square root of the distance between the two contact tips and/or directly proportional to the electrode wire 114 size for a given rise in electrode temperature. That is, the smaller the distance, the more current needed to achieve a certain temperature rise. The preheat current may flow in either direction between the contact tips 208, 218.

To avoid unwanted kinking, buckling, or jamming of the electrode wire 114, a guide 214 may be provided to guide the electrode wire 114 as it travels from the second contact tip 208 to the first contact tip 218. The guide 214 may be fabricated from ceramic, a dielectric material, a glass-ceramic polycrystalline material, and/or another non-conductive material. The contact tip assembly 200 may further comprise a spring-loaded device, or equivalent device, that reduces wire kinking, buckling, and jamming, while increasing wire contact efficiency by keeping the electrode wire 114 taught and/or straight.

In the illustrated embodiment, both the first contact tip 218 and the second contact tip 208 are present within the body 204 of a welding torch. In other embodiments, however, one or more of the second contact tip 208 and the first contact tip 218 may be positioned at a different location, e.g. outside the body 204 of a welding torch.

In some embodiments, for instance, the second contact tip 208 may be positioned at the wire feeder (e.g., at welding equipment 110) or another extended distance, to introduce the preheat current, in which case the preheat current may exit a contact tip in the torch 204. The contact tip in the torch 204 may be the same, or different, from the contact tip where the welding current is introduced to the electrode wire 114. The preheat contact tip(s) may be further positioned along the electrode wire 114 to facilitate use with Push-Pull Guns, such as those available from Miller Electric of Appleton, Wisconsin. The liner could be made from ceramic rollers so the preheat current could be injected back at the feeder and be a very low value due to the length of the liner.

In some embodiments, the first contact tip 218 and a second contact tip 208 may be positioned on each side of a gooseneck bend. For example, a preheat section may be curved (e.g., non-straight). That is, wire is fed through a section of the torch that has a bend greater than 0 degrees or a neck that would be considered a "gooseneck". The second contact tip 208 may be positioned before the initial bend and the first contact tip 218 after the bend is complete. Such an arrangement may add the benefit to the connectivity of the heated wire moving through the portion of the neck between the two contact tips. Such an arrangement results in a more reliable connection between the two contact tips where an off axis, machined dielectric insert was previously needed.

Generally, the welding current is generated, or otherwise provided by, a first power supply 202a, while the preheat current is generated, or otherwise provided by, a second power supply 202b. The first power supply 202a and the second power supply 202b may ultimately share a common power source (e.g., a common generator or line current connection), but the current from the common power source is converted, inverted, and/or regulated to yield the two separate currents—the preheat current and the welding current. For instance, the preheat operation may be facilitated with a single power source and associated converter circuitry. In which case, three leads may extend from the welding equipment 110 or an auxiliary power line in the welder, which could eliminate the need for the second power supply 202b.

The preheat current and welding current may be DC, AC, pulsed DC, and/or a combination thereof. For example, the welding current may be AC, while the preheat current may be DC, or vice versa. Similarly, the welding current may be DC electrode negative (DCEN) or a variety of other power schemes. In certain aspects, the welding current waveform may be further controlled, including constant voltage, constant current, and/or pulsed (e.g., AccuPulse). In certain aspects, constant voltage and/or constant power, constant penetration, and/or constant enthalpy may be used to facilitate preheat instead of constant current. For example, it may be desirable to control the amount of penetration into the workpiece. In certain aspects, there may be variations in contact tip to work distances that under constant voltage weld processes will increase or decrease the weld current in order to maintain a voltage at or close to the target voltage command, and thus changing the amount of penetration/heat input into the weld piece. By adjusting the amount of preheat current in response to changes to contact tip to work changes the penetration/heat input can be advantageously controlled. Furthermore, penetration can be changed to reflect a desired weld bead/penetration profile. For example, the preheat current may be changed into a plurality of waveforms, such as, but not limited to, a pulse type waveform to achieve the desired weld bead/penetration profile.

The current could be line frequency AC delivered from a simple transformer with primary phase control. Controlling the current and voltage delivered to the preheat section may be simpler using a CC, CV, or constant power depending on how the control is implemented as well as the power supply configuration to do it. In another aspect, the welding power source for consumable arc welding (GMAW and SAW) may include regulating a constant welding current output and adapt wire speed to maintain arc length or arc voltage set-point (e.g., CC+V process control). In yet another aspect, the welding power source may include regulating a constant welding voltage output (or arc length) and adapt wire speed to maintain arc current set-point (e.g., CV+C process control). The CC+V and CV+C process controls allow for accommodation of wire stick-out variation and pre-heat current/temperature variation by adapting wire feed speed (or variable deposition). In yet another aspect, the power source may include regulating a constant welding current output, the feeder maintains constant deposition, and the pre-heat power source adapts preheat current (or pre-heat power) to maintain constant arc voltage (or arc length). It can be appreciated that the addition of pre-heat current/power adds a new degree of freedom to the wire welding processes (GMAW and SAW) that allows flexibility and controllability in maintaining constant weld penetration and weld width (arc current), deposition (wire speed) and process stability (arc length or voltage). These control schemes may be switched during the welding process, for example, CV+C for arc start only, and other control schemes for the main weld.

The welding system 200 may be configured to monitor the exit temperature of the electrode wire 114 between the preheat contact tips (e.g., the preheat temperature), as illustrated, between the first contact tip 218 and the second contact tip 208. The preheat temperature may be monitored using one or more temperature determining devices, such as a thermometer, positioned adjacent the electrode wire 114, or otherwise operably positioned, to facilitate periodic or real-time feedback. Example thermometers may include both contact sensors and non-contact sensors, such as non-contact infrared temperature sensors, thermistors, and/or thermocouples. An infrared thermometer determines temperature from a portion of the thermal radiation emitted by the electrode wire 114 to yield a measured preheat temperature. The temperature determining device may, in addition to or in lieu of the thermometers, comprise one or more sensors and/or algorithms that calculate the preheat temperature of the electrode wire 114. For example, the system may dynamically calculate temperature based on, for example, a current or voltage. In certain aspects, the thermometer may measure the temperature of the dielectric guide or first contact tip to infer the wire temperature.

In operation, the operator may set a target predetermined preheat temperature whereby the welding system 200 dynamically monitors the preheat temperature of the electrode wire 114 and adjusts the preheat current via the second power supply 102b to compensate for any deviation (or other difference) of the measured preheat temperature from the target predetermined preheat temperature. Similarly, controls may be set such that a welding operation cannot be performed until the electrode wire 114 has been preheated to the predetermined preheat temperature.

The example assembly 200 preheats a section of the electrode wire 114 to reduce the presence of hydrogen in the electrode wire 114 prior to welding. In some examples, the assembly 200 may monitor hydrogen levels in the electrode wire 114 and preheat a section of the electrode wire 114 to reduce hydrogen prior to welding. The assembly 200 includes an electrode preheating control circuit 222. The electrode preheating control circuit 222 is operable to control the preheating power supplied by the power supply 202b to maintain a substantially constant heat input to a weld (e.g., a heat input within a range). In some examples, the electrode preheating control circuit 222 controls the preheating power based on estimating the stickout heating of the electrode wire 114 and by modifying the preheating power provided by the power supply 202b based on changes in the estimated stickout heating.

In some examples, the electrode preheating control circuit 222 receives a hydrogen measurement signal from a hydrogen sensor and adjusts the preheat parameters (e.g., current, voltage, power, enthalpy, etc.) of the preheating power supply 202b and/or the welding parameters of the welding power supply 202a.

By preheating the electrode wire 114 to a desired temperature at speed at which the electrode wire 114 is feeding out of the assembly 200, relative to the amount of hydrogen present or allowable, the assembly 200 more easily reduces and/or eliminates excess hydrogen than conventional methods of hydrogen reduction.

The electrode preheating control circuit 222 controls the preheat parameters, such as preheat power, current, voltage and/or joule heating, based on observed baking effectiveness for the type of electrode wire to reduce moisture in the type of electrode wire, and based on the feed speed of the electrode wire 114. For instance, a higher feed rate of the electrode wire 114 may require higher preheat power. Welding with tubular electrodes on butt seams may require less preheat power than tubular electrodes with a joggle joint. Larger diameter tubular wire with more cross-sectional area may require higher preheat power.

The example electrode preheating control circuit 222 may use a look-up table or other memory structure to retrieve preheat parameters based on inputs to the electrode preheating control circuit 222 (e.g., via a user interface or another input method). For example, the electrode preheating control circuit 222 may use a wire feed speed, a wire type (e.g., tubular wire, solid wire, a wire name, etc.), and/or a wire diameter, to identify in the table one or more of a preheating current, a preheating voltage, a preheating enthalpy, a wire temperature, and/or a wire resistance (e.g., indicative of the temperature of the wire) to be used to control the preheating power supply 202b. The wire type may be identified, for example, using a model number, universal product code (UPC), and/or any a physical description of the wire. In addition to diameter, composition, and wire feed speed, the resistance of the wire may also be included as a variable for determining the preheat. For example, the sheath thickness of a tubular wire and/or a fill percentage (e.g., the ratio of core material weight to sheath weight) at least partially determines the resistance of the wire. The preheating distance may be an input, fixed, and/or dynamically controllable and, therefore, may be used as an input variable for the look-up table. The data in the look-up tables may be determined empirically by testing different wire types to determine hydrogen content using different resistive heating levels and/or time periods.

When included, a hydrogen sensor monitors the level of hydrogen on and/or proximate to the electrode wire 114. For example, the hydrogen sensor may be a Palladium (Pd) based sensor such as a Palladium-functionalized carbon nanotube (CNT). Another example implementation of the hydrogen sensor is as a diode-based Schottky sensor with a Pd-alloy gate. Additionally or alternatively, highly-ordered vertically oriented titanium dioxide (TiO2) nanotube microelectromechanical systems (MEMS) sensors may be incorporated in the welding torch to detect low levels (e.g., in parts per million, parts per billion, etc.) of hydrogen in or proximate to the electrode wire 114. The electrode preheating control circuit 222 may perform closed-loop control of the preheating power supply 202b based on the hydrogen measurement received from the hydrogen sensor. A hydrogen sensor may also be placed near a preheat chamber as a measure of hydrogen level before depositing the electrode wire 114 into the weld pool at the workpiece 106 to form the weld metal. A moisture sensor may be used instead of or as a complement to the hydrogen sensor.

The example assembly 200 allows a tubular electrode to be produced at low cost and yet achieve low hydrogen performance. The assembly 200 may also reduce the cost of reducing or preventing hydrogen pick up during production of the electrode wire 114, such as the costs associated with strip steel quality, drawing lube, flux sourcing and storage, and/or other production, storage and/or procurement costs can be minimized. Furthermore, the cost of packaging and/or storage against moisture pick up in the electrode wire 114 can be reduced and the shelf life of the electrode wire 114 can be extended.

Because hydrogen reduction is improved, a greater variety of tubular wires can be selected by fabricators for mechanical properties with hydrogen immunity provided by the example assembly providing wire preheating at the weld torch. The reduction of hydrogen is made easier because it is not dependent on stickout length as in conventional techniques. End users cannot typically regulate stickout length in a consistent manner, so performing hydrogen reduction via preheating allows for a fixed, self-regulated preheat length so that the wire heating will be consistent and not reliant on stickout length. The shorter stickout length also improves the response to shorting and/or stubbing events by the welding power supply 202*a*. The preheat hydrogen reduction method further eliminates the need to pre-bake the electrode wire 114 for a significant period of time before using the wire 114. The preheat hydrogen reduction method can heat the electrode wire 114 more than possible when using a traditional extended stickout method, further reducing hydrogen levels prior to introduction to the weld than conventional methods.

Etching Methods and Systems

In some embodiments, an electrical arc(s) can be used to remove the oxide layer of aluminum welding wire. Aluminum is highly reactive, and forms a surface oxide layer when exposed to atmospheric conditions. The oxide layer contains significant amounts of water from atmospheric humidity. The water provides a source of hydrogen, which can cause porosity in an aluminum weld. Therefore, it is advantageous to remove the oxide layer, and to reduce or prevent the re-formation of the oxide layer after cleaning. Accordingly, disclosed systems and methods may be configured to remove the oxide layer of aluminum welding wire (as well as any other surface contaminant) via electric arc preheating of the wire. Gas is flowed across the wire during the etching process in order to prevent the re-formation of the oxide layer on the aluminum welding wire. Similarly, the disclosed systems and methods may be configured to remove organic contaminants from welding wire during the preheating process. Removing organic contaminants prevents weld defects caused by "dirty" welding wire, which can include porosity in the weld.

Disclosed examples involve etching the wire after unwinding from the wire spool and prior to the arc. For example, the wire may be etched via an electric arc, e.g. formed by one or more tungsten electrodes, located at any points between the wire source and the arc. Etching a welding wire provides a number of potential benefits, which are described in U.S. patent application Ser. No. 16/553,522, filed Aug. 28, 2019, and entitled "Systems and Methods for Wire Surface Oxidation Removal and/or Wire Preheating Using a Tungsten Arc" The entirety of U.S. patent application Ser. No. 16/553,522 is incorporated herein by reference.

In some embodiments, the system may be configured to etch a welding wire via electric arc preheating. The system contains one or more tungsten electrodes which preheat the fed welding wire via arc wire heating. In the welding type system, the one or more tungsten electrodes may be connected to the welding power supply to provide preheating power and/or to a separate source of preheating power. In some examples, the one or more tungsten electrodes in the welding torch may be connected to one or more dedicated preheating power sources.

Figure 2:
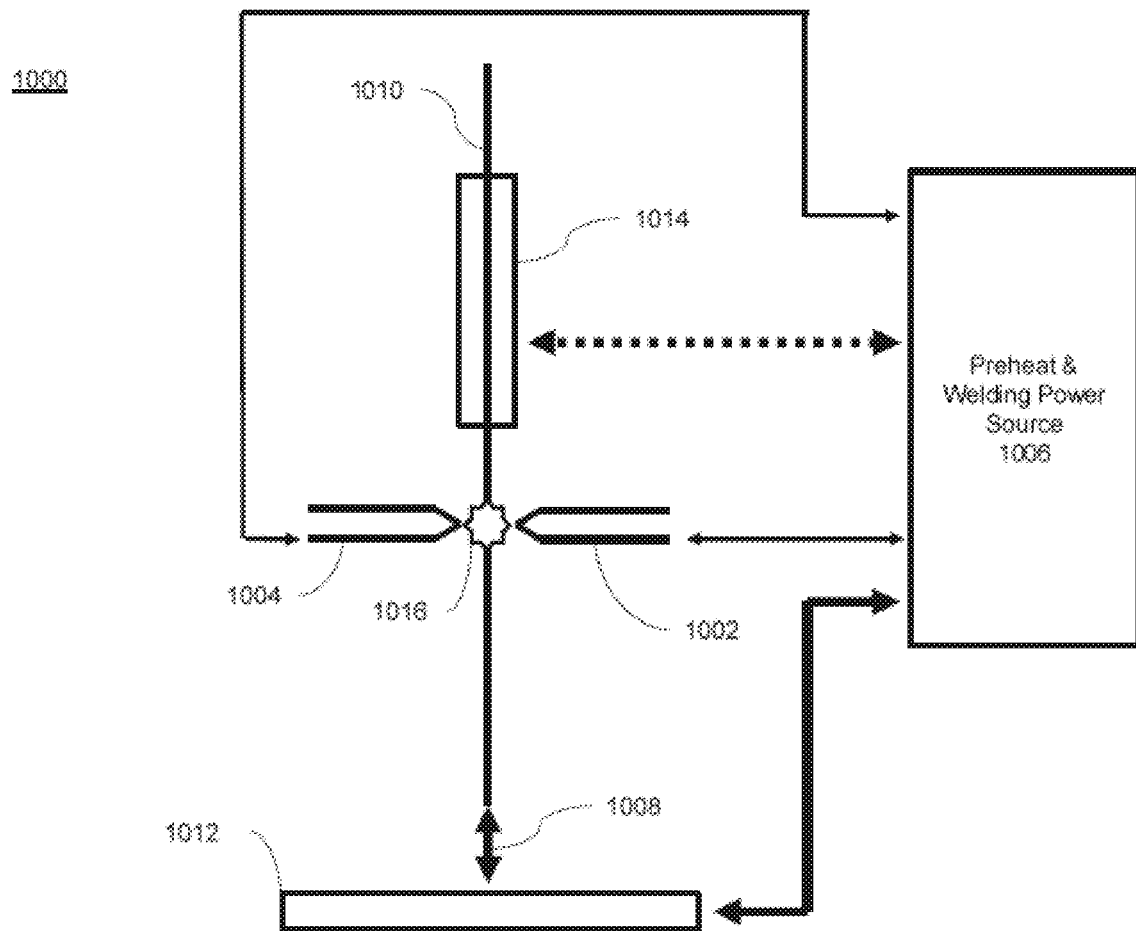
FIG. 2 illustrates an embodiment of a system for etching a welding wire.
Figure 3:
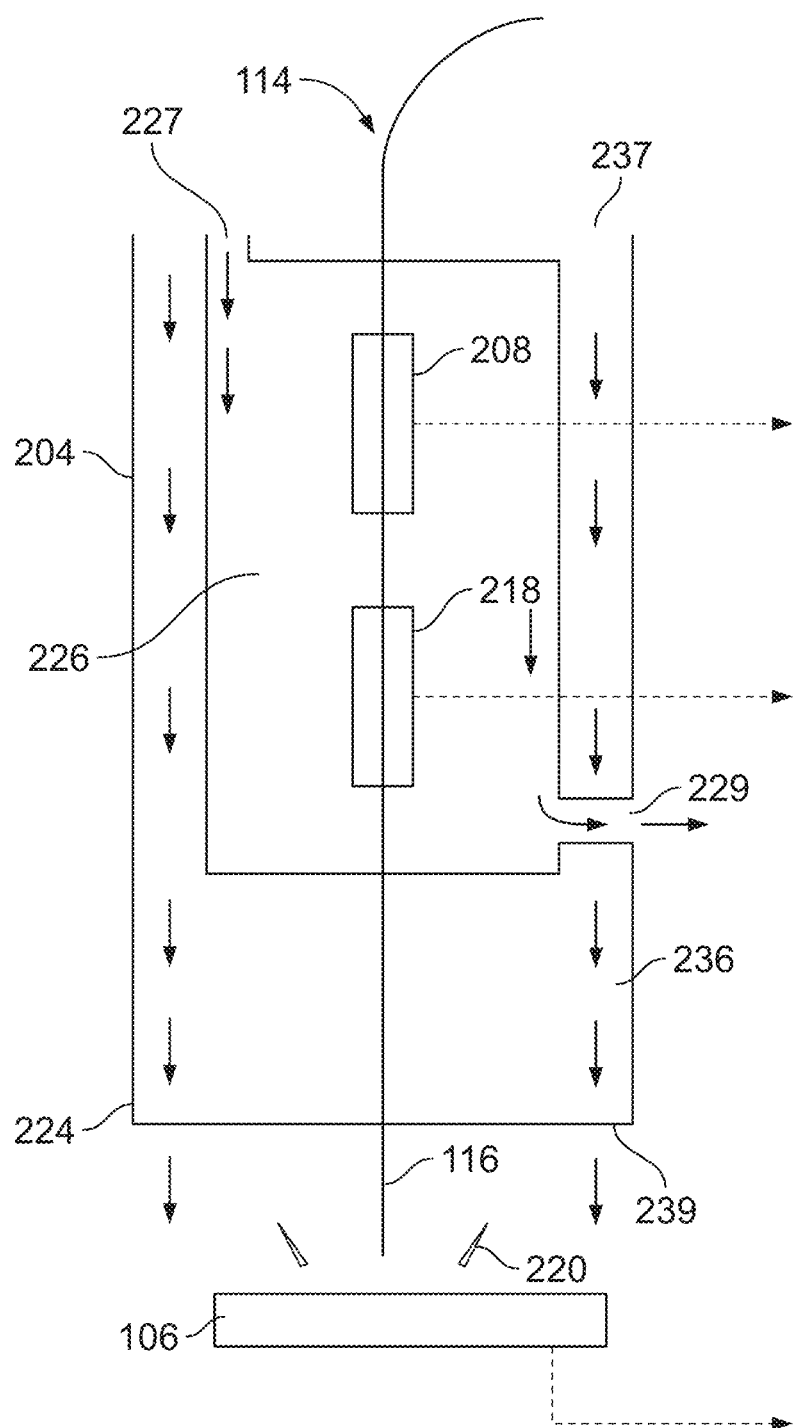
FIG. 3 illustrates an embodiment of a system for pre-heating a welding wire, in which the gas outlet of a pre-heating chamber is isolated from the shielding gas chamber.

FIG. 2 is a block diagram of an exemplary electric arc preheating system 1000 such as may be used for etching an aluminum wire. Preheating system 1000 includes a first tungsten electrode 1002 and a second tungsten electrode 1004. Each tungsten electrode 1002 and 1006 is electrically connected to the preheating power source 1006. The preheating power source 1006 is also a welding power source which provides welding power which provides power for a welding arc 1008 between welding wire 1010 and a workpiece 1012. In other embodiments, one or more of tungsten electrodes 1002 and 1006 may instead be electrically connected to one or more dedicated preheating power sources.

Welding wire 1010 is fed through a contact tip 1014 and delivered to a workpiece 1012. The contact tip 1014 is connected to the welding power source 1006 in order to provide power for a welding arc 1008 between the welding wire 1010 and the workpiece 1012. The workpiece 1012 is electrically connected to the power source 1006 in order to complete a circuit between the power source 1006, the contact tip 1014, and the welding wire 1010. In some examples, the welding wire 1010 is preheated by an electric arc 1016 between the first tungsten electrode 1002 and the second tungsten electrode 1004 through which the welding wire 1010 passes. In some examples, the electric arc 1016 includes a first arc from the first tungsten electrode 1002 to the welding wire 1010, and a second arc from the welding wire 1010 to the second tungsten electrode 1004, or vice versa.

In the illustrated embodiment, the tungsten electrodes 1002 and 1004 are positioned after the contact tip 1014 (i.e., the welding wire 1010 is preheated and etched downstream from the contact tip 1014). In other embodiments, however, the tungsten electrodes 1002 and 1004 may be positioned before the contact tip 1014 (i.e., the welding wire 1010 is preheated and etched upstream from the contact tip 1014).

As shown in the illustrated embodiment, the first tungsten electrode 1002 and the second tungsten electrode 1004 may be offset circumferentially (i.e. by 180 degrees) so as to etch both sides of an aluminum welding wire 1010. In some embodiments, the system 1000 may comprise greater than two electrodes. For instance, in some embodiments, the system 1000 may further comprise a third tungsten electrode. The first tungsten electrode, the second tungsten electrode, and the third tungsten electrode may be offset circumferentially (i.e. by 120 degrees) so as to evenly etch an aluminum welding wire 1010. In some embodiments, the system 1000 may further comprise a fourth tungsten electrode. The first tungsten electrode, the second tungsten electrode, the third tungsten electrode, and the fourth tungsten electrode may be offset circumferentially (i.e. by 90 degrees) so as to evenly etch an aluminum welding wire 1010.

When a preheating system is being used to etch, one or both of the tungsten electrodes may be set to be electrode positive. Arcs using electrode positive polarity (e.g., the tungsten electrodes have a positive voltage relative to the electrode wire) more readily remove oxidation layers on aluminum welding wire compared to electrode negative polarity. Preheating aluminum welding wire with an electrode positive arc therefore removes the oxidation layer from the aluminum welding wire. In some examples, the electrodes may be connected to alternating current power sources. When connected to alternating current power sources, the electric arc(s) between the tungsten electrodes will have a positive component, and the positive component removes the surface oxidation of aluminum welding wire. To remove surface oxidation from aluminum welding wire, tungsten electrodes can be connected to a power source with a positive time component. In some embodiments, the preheating system may be connected to a polyphase power source (e.g., three electrodes are connected to the three phases of a three-phase power source). Since polyphase systems utilize alternating current, when polyphase systems are utilized, at any given time at least one arc is electrode positive, which facilitates removal of contaminants from aluminum welding wire Isolation of the Pre-Treating Gas Outlet from the Shielding Gas In order to facilitate the removal of hydrogen from a wire 114 during a pre-treating process and/or to prevent the re-formation of an oxide layer on an aluminum welding wire after etching, a gas flow may be provided around the wire 114. For simplicity, this gas may be referred to herein as a pre-heating gas, regardless of whether the pre-treatment involves pre-heating, etching, or both. Because the shielding gas used in the welding operation is capable as operating as the pre-heating gas, the shielding gas for the welding operation has previously been used as the pre-heating gas. As shown in FIG. 1, for instance, the shielding gas inlet 206 is positioned upstream of at least a portion of the pre-heating zone, e.g. upstream of the first contact tip 218. However, it has presently been recognized that use of the shielding gas as the pre-heating gas may suffer from a significant drawback.

Hydrogen and/or other contaminants removed from the wire 114 during the pre-treating step is transferred into and carried by the gas that exits the pre-treating zone. Therefore, when the shielding gas for the welding operation is utilized as the pre-treating gas, the hydrogen and/or other contaminants from the wire are pushed toward the welding arc 220. Hydrogen from the shielding gas can thus become trapped in a weld, much in the same way that hydrogen from the wire can become trapped in a weld, leading to the same problems of cracking, brittleness, and/or porosity. Embodiments of the present disclosure provide methods and systems by which the pre-treating gas can be separated from the shielding gas, such that the shielding gas that is directed toward the welding arc 220 does not contain hydrogen contaminants from the pre-treating step.

Embodiments of the present disclosure thereby provide a multiple flowpaths for the shielding gas. The multiple flowpath system comprises a first flowpath by which a first portion of the shielding gas surrounds the electrode wire 114 during the pre-treating step and a second flowpath by which a second portion of the shielding gas surrounds the electrode wire 114 at the distal end of the torch 204. The first portion of the shielding gas, i.e. the portion of the shielding gas that operates as the pre-treating gas, exits a pre-heating zone and is desirably directed away from the welding arc 220, e.g. away from the distal end of the torch. The second portion of the shielding gas, i.e. the portion of the shielding gas that is used for the welding operation, exits through the distal end of the torch by any conventional manner (e.g., a nozzle) and is free from hydrogen contaminants released during the wire pre-treatment.

Other embodiments of the present disclosure utilize a pre-treating gas that is distinct from the shielding gas for the welding operation. Those embodiments utilize a multiple flowpath system that involves independent gas inlets. The system comprises a first gas flowpath by which a pre-treating gas surrounds the electrode wire 114 during the pre-treating step and a second gas flowpath by which a shielding gas surrounds the electrode wire 114 at the distal end of the torch 204. The gas inlet associated with the first gas flowpath is distinct from the gas inlet associated with the second gas flowpath, such that the pre-treating gas may be a distinct gas from the shielding gas. The pre-treating gas exiting the first flowpath is desirably directed away from the welding arc 220, e.g. away from the distal end of the torch. The shielding gas exits the second flowpath through the distal end of the torch by any conventional manner (e.g. nozzle) and is free from hydrogen contaminants released during the wire pre-treatment.

The shielding gas can also be utilized as the pre-treating gas in a system having distinct gas inlets. For instance, a gas line supplying the shielding gas could simply be split into first and second shielding gas lines, with the first being attached to the distinct pre-treating gas inlet and the second being attached to the distinct shielding gas inlet.

Embodiments of the present disclosure are directed to a welding system or assembly 200 or a welding torch 204 comprising a pre-heating gas chamber 226 and a shielding gas chamber 236. For simplicity, the term pre-heating gas chamber 226 will be used throughout, although it is to be understood that the term applies equally to the gas chamber in which wire etching is performed. The pre-heating gas chamber 226 surrounds at least a first portion of the electrode wire 114. The shielding gas chamber 236 surrounds at least a second portion of the electrode wire 114. The second portion of the electrode wire 114 is downstream from the first portion of the electrode wire, i.e. located closer to the distal end of the torch 224 and to the welding arc 220.

In some embodiments, the pre-heating gas chamber 226 and the shielding gas chamber 228 may both be positioned within the welding device, e.g. the torch 204. For instance, in some embodiments, the first contact point 218 and the second contact point 208 of a resistive preheat system (or the first electrode 1002 and second electrode 1004 of an etching system) may be positioned within the torch body 204. Embodiments of the present disclosure are directed to a welding assembly 200 that includes a welding torch 204 comprising the pre-heating gas chamber 226 and the shielding gas chamber 228 positioned within the torch 204, as described herein. In other embodiments, at least a portion of the pre-heating gas chamber 226 may be external to the torch body 204. For example, in some embodiments, the second contact point 208 or both the second contact point and the first contact point 218 (or similarly, one or more of the first and second electrodes 1002, 1004) may be positioned upstream of the welding device, e.g. the torch body 204. Embodiments of the present disclosure are also directed to a welding assembly 200 that includes a pre-heating gas chamber 226, at least a portion of which is external to the welding device, e.g. torch body 204, itself.

The pre-heating gas chamber 226 comprises a gas inlet 227 and a gas outlet 229. The shielding gas chamber 236 also comprises a gas inlet 237 and a gas outlet 239. In some embodiments, the gas inlet 227 of the pre-heating chamber 226 may be fluidly connected to the gas inlet 237 of the shielding gas chamber 236. In other embodiments, the gas inlet 227 of the pre-heating chamber 226 may not be fluidly connected to the gas inlet 237 of the shielding gas chamber 236. In some embodiments, a single gas supply may be used as both the pre-heating gas and the shielding gas. In other embodiments, a first gas supply may be provided for use as the pre-heating gas and a second, distinct, gas supply may be provided for use as the shielding gas.

In some welding operations, for instance, the shielding gas may be relatively expensive. Accordingly, by providing a user with the ability to utilize a pre-heating gas that is separate and distinct from the shielding gas, embodiments of the present disclosure provide significant benefits. In other embodiments, the ease of operation provided by a system having a single gas supply connection may be desired.

In some embodiments, a welding device may be configured so that a user may alternate between independent gas inlets 227, 237 and fluidly connected gas inlets. In that way, the system may be operated in either manner, depending on a variety of considerations including the economic considerations of the welding operation being performed, the experience of the user, the availability of a distinct pre-heating gas supply, and the like. For example, in some embodiments, the system may comprise a component, such as a controllable baffle, by which the inlet 227 of the pre-heating chamber 226 and the inlet 237 of the shielding gas chamber 236 may be brought into either a first orientation, in which the inlets 227, 237 are fluidly connected (allowing for a single gas supply), or a second orientation, in which the inlets are not fluidly connected (allowing for a distinct pre-heating gas supply).

While the inlet 227 of the pre-heating chamber 226 and the inlet 237 of the shielding gas chamber 236 may be fluidly connected, the outlet 229 of the pre-heating chamber 226 is desirably distinct from the outlet 239 of the shielding gas chamber 236. The outlet 239 of the shielding gas chamber 236 is configured so that the shielding gas that flows through the outlet 239 flows around a portion of the wire 114 that extends from the distal end 224 of the welding device 204. In this way, the shielding gas is directed toward the weld pool. In contrast, it is desirable to direct the pre-heating gas away from the weld pool. In particular, the outlet 227 of the pre-heating chamber 226 is desirably configured such that pre-heating gas that flows through the outlet is directed away from the distal end 224 of the welding implement 204. Put another way, the outlet 227 of the pre-heating chamber 226 is configured such that pre-heating gas that flows through the outlet is directed away from the outlet 229 of the pre-heating chamber 226.

In some embodiments, the gas exiting the outlet 229 of the pre-heating chamber 226 may be vented to the atmosphere. The venting preferably occurs in a direction away from the portion of the wire extending from the distal end of the welding implement 204. Where the pre-heating chamber 226 is positioned within the torch 204, for instance, the outlet 229 of the pre-heating chamber 226 must be positioned so that the gas flows out of a port in the body of the torch 204 at a distance from the distal end 224. Desirably, the outlet 229 may also be oriented to direct the gas at an angle of at least 25 degrees from the distal end of the torch 224, alternatively at least 35 degrees, alternatively at least 45 degrees, alternatively at least 60 degrees, alternatively at least 75 degrees, alternatively at least 90 degrees. In other embodiments, the gas exiting the outlet 229 of the pre-heating chamber 226 may flow into a gas line, by which the used pre-heating gas may be transported into a collection container, recycled, or the like.

Figure 4:
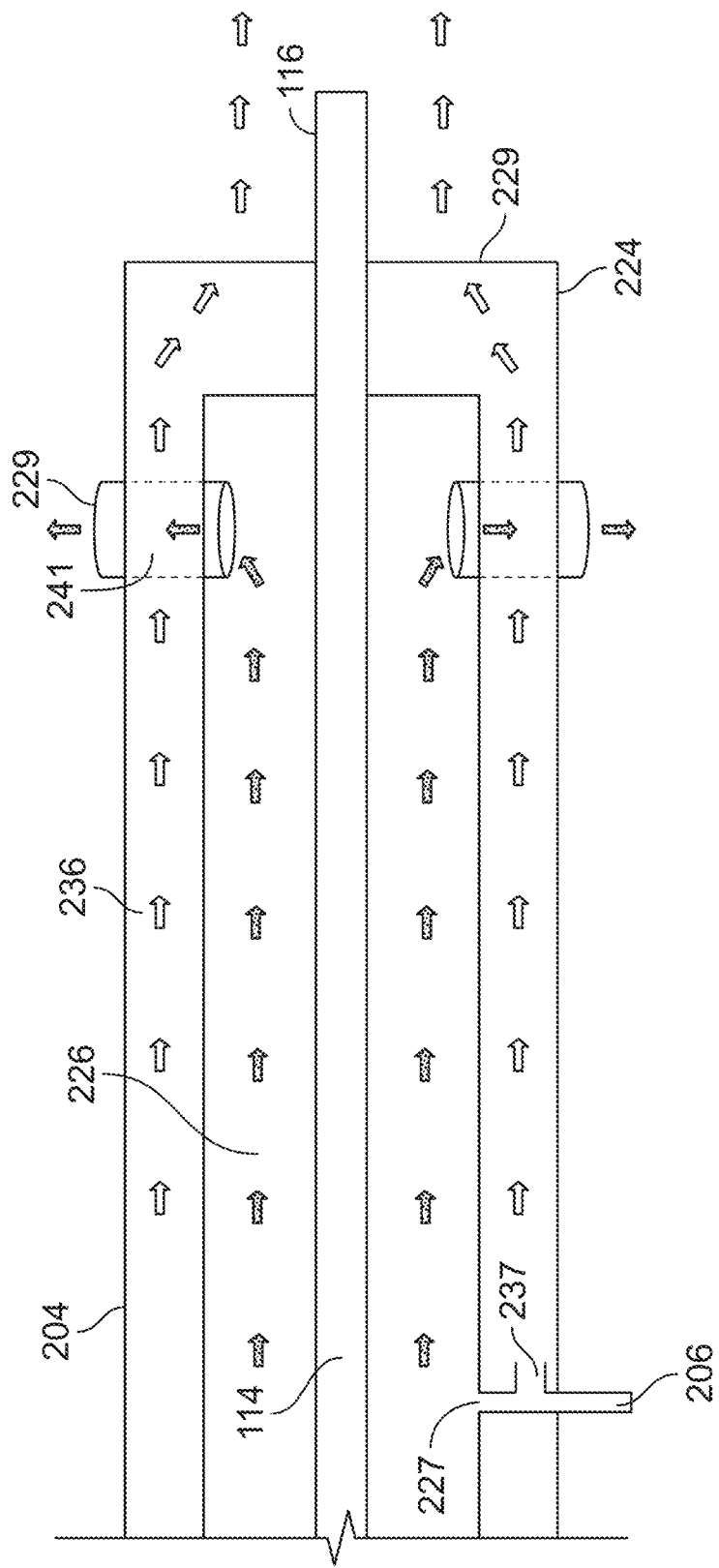
FIG. 4 illustrates an embodiment of a system for cleaning a welding wire via a pre-treatment (e.g. pre-heating, etching) in which the gas exiting a cleaning chamber is isolated from the shielding gas, the cleaning chamber being at least partially nested within the shielding gas chamber, and the gas inlet for the cleaning chamber being fluidly connected to the gas inlet for the shielding gas chamber.

In some embodiments, the pre-heating chamber 226 may be at least partially nested within at least a portion of the shielding gas chamber 236. An example of such an embodiment is illustrated in FIG. 4. In such an embodiment, the outlet 229 of the pre-heating chamber 226 may comprise one or more bypass ducts 241 extending through the shielding gas chamber 236. In this manner, the pre-heating gas exiting the pre-heating chamber 226 may be prevented from mixing with the shielding gas flowing through the shielding gas chamber 236 and directed toward the weld.

In the embodiment illustrated in FIG. 4, the inlet 227 of the pre-heating chamber 226 and the inlet 237 of the shielding gas chamber 236 are shown as being operatively connected so that a gas supply line can be connected to the torch 204 at a single connection port 206 in order to supply gas into both chambers. However, as explained previously, in other embodiments, the inlet 227 of the pre-heating chamber 226 may be associated with a first gas supply connection port 245 and the inlet 237 of the shielding gas chamber 237 may be associated with a second, distinct gas supply connection port 246. Such an embodiment is illustrated, for example, in FIG. 5. In yet other embodiments, the system may be configured to allow for the connection of both a single gas supply line and separate gas supply lines.

Figure 6:
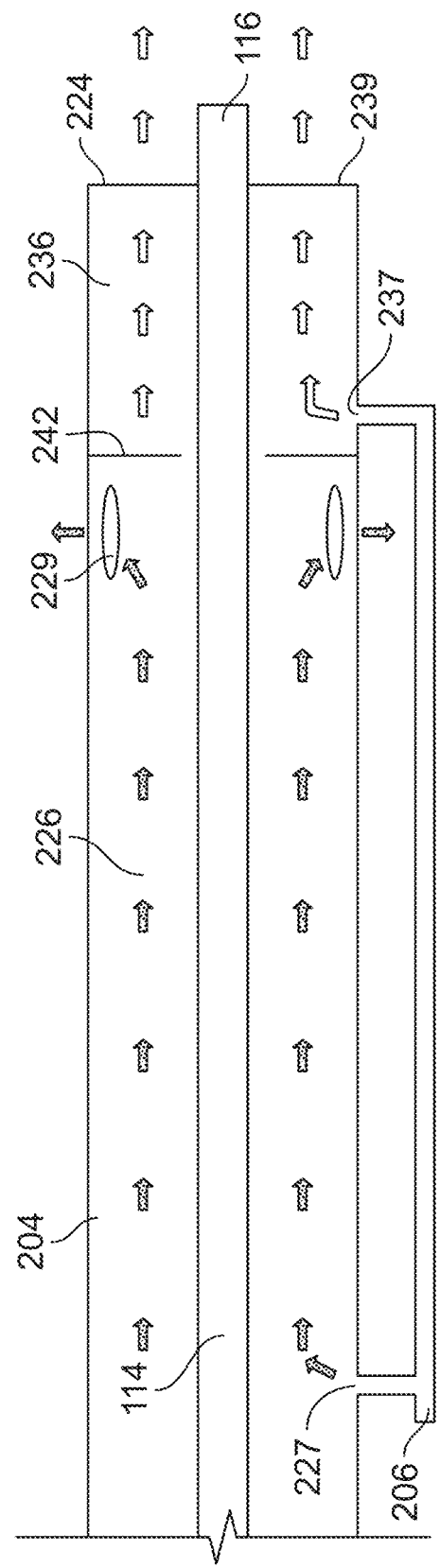
FIG. 6 illustrates an embodiment of a system for cleaning a welding wire via a pre-treatment (e.g. pre-heating, etching) in which the gas exiting a cleaning chamber is isolated from the shielding gas, the cleaning chamber being positioned upstream from the shielding gas chamber, and the gas inlet for the cleaning chamber being fluidly connected to the gas inlet for the shielding gas chamber.

In other embodiments, the pre-heating chamber 226 may be positioned upstream from the shielding gas chamber 236. An example of such an embodiment is illustrated in FIG. 6. In such an embodiment, a downstream end of the pre-heating chamber 226 may be separated from an upstream end of the shielding gas chamber 236 by one or more baffles 242. In this manner, the pre-heating gas flowing through the outlet 229 of the pre-heating chamber 226 may be exit the welding device 204 upstream from the shielding gas chamber 236.

In the embodiment illustrated in FIG. 6, the inlet 227 of the pre-heating chamber 226 and the inlet 237 of the shielding gas chamber 236 are shown as being operatively connected so that a gas supply line can be connected to the torch 204 at a single connection port 206 in order to supply gas into both chambers. However, as explained previously, in other embodiments, the inlet 227 of the pre-heating chamber 226 may be associated with a first gas supply connection port 245 and the inlet 237 of the shielding gas chamber 237 may be associated with a second, distinct gas supply connection port 246. Such an embodiment is illustrated, for example, in FIG. 7. In yet other embodiments, the system may be configured to allow for the connection of both a single gas supply line and separate gas supply lines.

Figure 5:
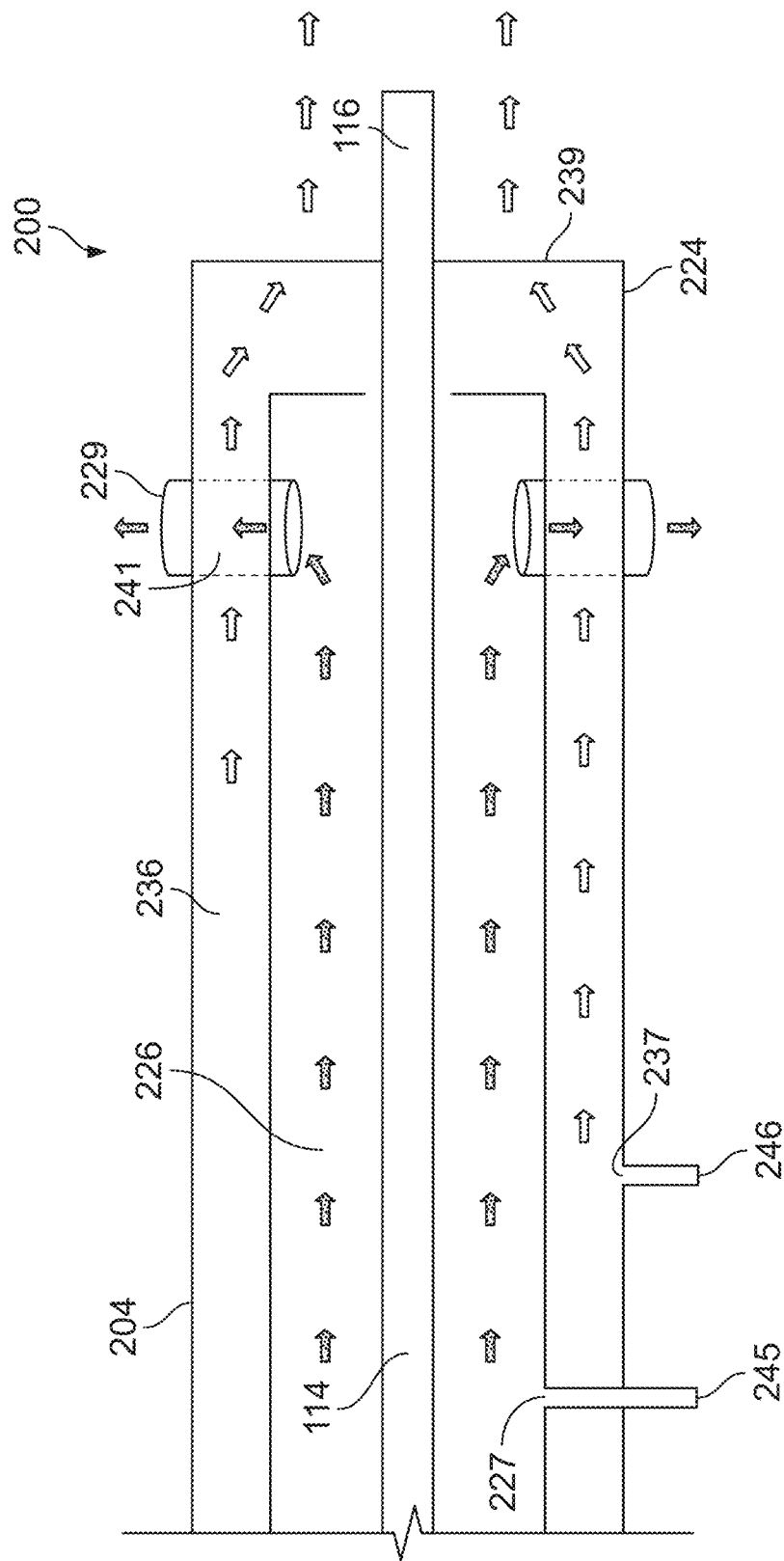
FIG. 5 illustrates an embodiment of a system for cleaning a welding wire via a pre-treatment (e.g. pre-heating, etching) in which the gas exiting a cleaning chamber is isolated from the shielding gas, the cleaning chamber being at least partially nested within the shielding gas chamber, and the gas inlet for the cleaning chamber being independent from the gas inlet for the shielding gas chamber.
Figure 7:
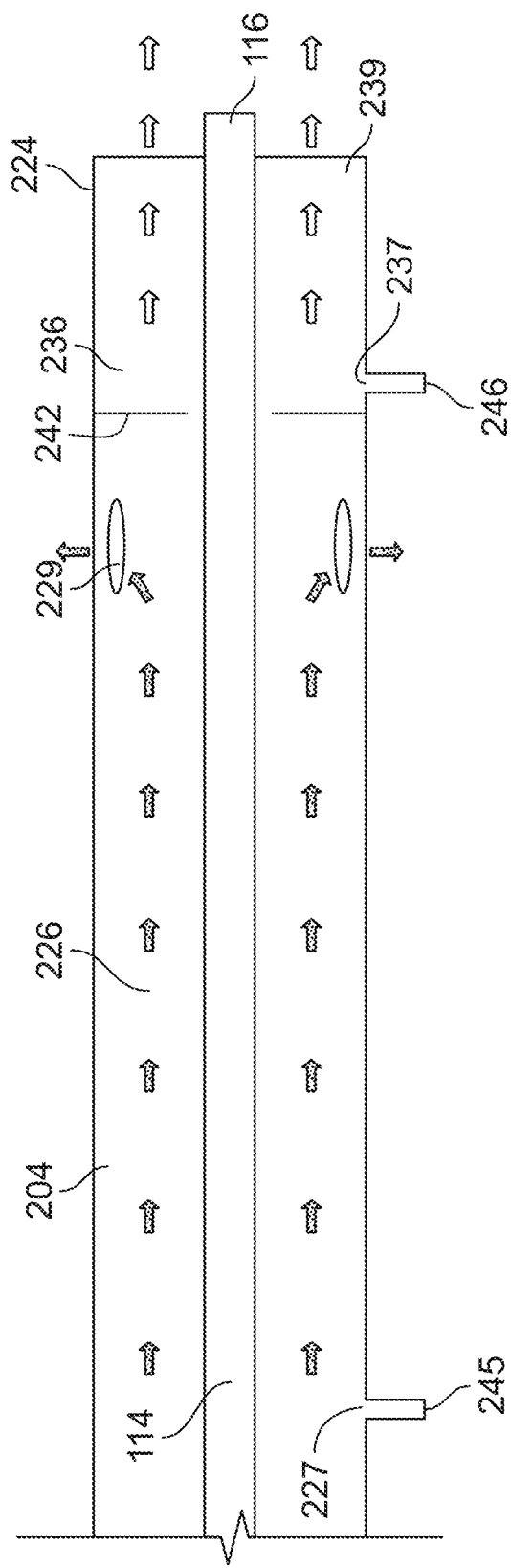
FIG. 7 illustrates an embodiment of a system for cleaning a welding wire via a pre-treatment (e.g. pre-heating, etching) in which the gas exiting a cleaning chamber is isolated from the shielding gas, the cleaning chamber being positioned upstream from the shielding gas chamber, and the gas inlet for the cleaning chamber being independent from the gas inlet for the shielding gas chamber.
Figure 8:
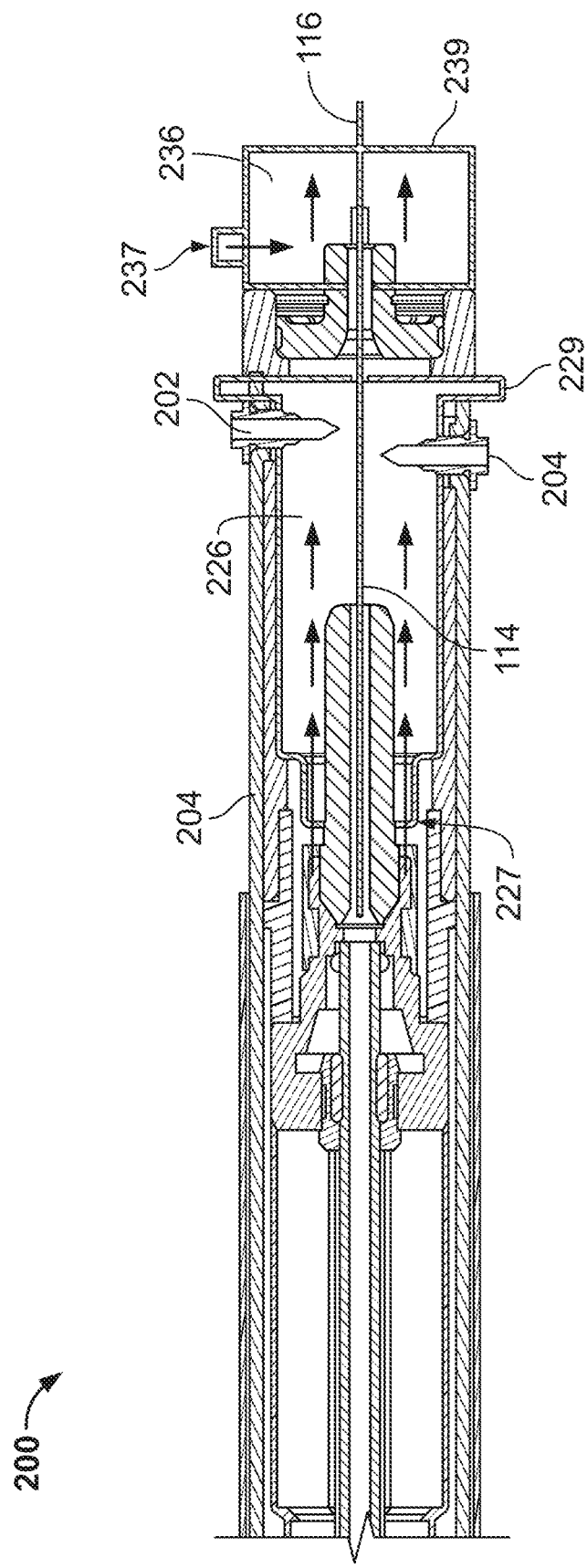
FIG. 8 illustrates an embodiment of a system for etching a welding wire, in which the gas outlet of an etching chamber is isolated from the shielding gas chamber.

Both the nested arrangement illustrated in FIGS. 4-5 and the upstream/downstream arrangement illustrated in FIGS. 6-7 are applicable for any type of pre-treatment, including both pre-heating of an electrode wire and etching of a filler wire such as an aluminum wire. FIG. 8 shows an embodiment of a system for etching a filler wire 114 using electrodes 202 and 204 in which the pre-treating chamber 226 is isolated from the shielding gas chamber 236. In FIG. 8, the pre-treating chamber 226 is positioned upstream of the shielding gas chamber 236. However, in an alternative, non-illustrated embodiment, the pre-treating chamber 226 may be at least partially nested within the shielding gas chamber 236.

Further, although a nested arrangement of the pre-treatment chamber 226 and the shielding gas chamber 236 and an upstream/downstream arrangement of the pre-treatment chamber 226 and shielding gas chamber 236 are shown in illustrated embodiments, other manners of isolating the outlet of the pre-treating chamber 226 from the outlet of the shielding gas chamber 236 are contemplated without departing from the scope of the present disclosure.

Enhancing Hydrogen Removal from the Wire

Where the pre-treatment step is performed in a manner in which the gas exiting the pre-treatment is isolated from the shielding gas of the welding operation, the operating parameters of the pre-treatment may also be altered in order to provide for a more efficient and effective removal of hydrogen from the wire. For instance, where the gas used during the pre-heating or etching process was then used as the shielding gas for the welding operation, one of skill in the art would have generally sought to prevent or minimize turbulence, since turbulence in shielding gas is undesirable. Because the flow of gas during (and after) the pre-treatment was generally relatively laminar, the hydrogen (and other contaminants) removed from the wire was transported away from the wire by diffusion.

According to embodiments of the present disclosure, on the other hand, the pre-treatment gas is brought to a highly turbulent state. The turbulence of the gas promotes the movement of hydrogen away from the wire during (and after) the pre-treatment.

Figure 9:
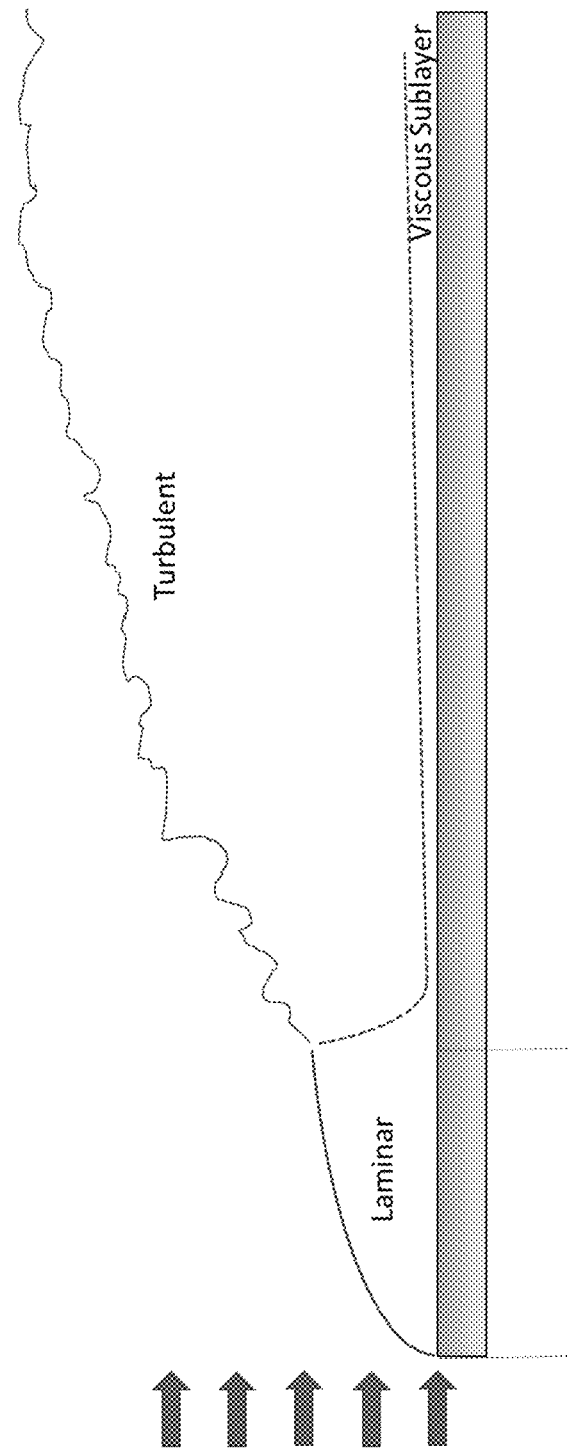
FIG. 9 illustrates the creation of a thin viscous layer at the surface of a wire when a pre-treatment gas is brought to turbulent flow.

This effect is illustrated in FIGS. 9 and 10. Namely, as shown in FIG. 9, above a critical Reynolds number a turbulent flow having a thin the viscous sub-layer is produced. The thin viscous sub-layer creates a large concentration and temperature gradient in close vicinity to the wire. These large gradients and the turbulence of the flow above the thin viscous layer assists in transporting the hydrogen (removed from the wire) away from the wire. Specifically, as shown in FIG. 10, in the turbulent flow region above the wire, the hydrogen will be removed by the advection bulk transport. This advection transport is significantly more effective than diffusion at transporting hydrogen and other removed contaminants away from the wire.

The quicker that the hydrogen (and other contaminants) can be transported away from the wire, the less likely it becomes that the hydrogen will either be taken back up by the wire or travel with the wire to the weld pool, where it could be taken up into the weld. Accordingly, embodiments of the present disclosure provide an enhanced wire cleaning process.

In some embodiments, a method of removing hydrogen from a filler wire involves pre-treating a wire to remove hydrogen, such as by the pre-heating or etching processes described herein, as the wire passes through a cleaning chamber 226. A gas is also passed through the cleaning chamber 226 from a gas inlet 227 to a gas outlet 229. The gas is caused to have a turbulent flow as it passes through the cleaning chamber 226.

The gas may be caused to have a turbulent flow through any number of mechanisms, as would generally be understood by those of skill in the art. For example, in some embodiments, the flow of the gas may be impinged at or near the inlet 227 to the cleaning chamber 226. The flow of gas may be impinged, for example, by a gas inlet having a decreased cross-section, an obstruction to flow, a roughened or textured surface, or a combination thereof. In some embodiments, the flowrate of the gas may simply be increased to achieve a desired degree of turbulence. A drawback to this approach, however, is that the gas supply will be more quickly spent. Therefore, it is desirable that the cleaning chamber 226 or the gas inlet 227 to the cleaning chamber have one or more flow impingers that are configured to create turbulent gas flow within the cleaning chamber.

The gas passing through the wire pre-cleaning chamber 226 may be caused to have a Reynolds number of at least 2100, alternatively at least 2500, alternatively at least 2800, alternatively at least 3000, alternatively at least 3200, alternatively at least 3500, alternatively at least 3800, alternatively at least 4000. In general, the higher the Reynolds number of the gas flow in the pre-cleaning chamber 226, the greater the advection transport effect, and the quicker the contaminants removed from the wire will be transported away from the surface of the wire.

Regarding the methods described herein, the system (e.g. the cleaning chamber 226 and shielding gas chamber 236) may be arranged as in any of the above-described and illustrated embodiments, although the method is not limited to any specific arrangement of the system unless expressly stated.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed:

1. A welding system comprising:
   a torch having a distal end;
   a filler wire positioned within the torch and extending from the distal end of the torch;
   a pre-treating chamber surrounding at least a portion of the wire; and
   a shielding gas chamber surrounding at least a portion of the wire;
   wherein the shielding gas chamber comprises an inlet and an outlet, the outlet being configured such that the shielding gas exiting the shielding gas chamber flows around the portion of the wire extending from the distal end of the torch during a welding operation;
   wherein the pre-treating chamber is positioned upstream of the shielding gas chamber and comprises a gas inlet and a gas outlet, and
   wherein the pre-treating chamber and the shielding gas chamber are separated by one or more baffles to fluidly isolate the gas outlet of the pre-treating chamber from the shielding gas chamber, such that gas exiting the pre-treating chamber does not enter the shielding gas chamber.

2. The welding system of claim 1, wherein the system is configured such that the gas exiting the gas outlet of the pre-treating chamber is directed away from the portion of the wire extending from the distal end of the torch.

3. The welding system of claim 2, wherein the gas outlet of the pre-treating chamber vents the gas to the atmosphere.

4. The welding system of claim 1, wherein the pre-treating chamber and the shielding gas chamber are both positioned within a body of the torch.

5. The welding system of claim 1, wherein the gas inlet of the pre-treating chamber and the inlet of the shielding gas chamber are operatively connected so that a gas line can be attached to a single connection port to supply gas flow into both chambers.

6. The welding system of claim 1, wherein the gas inlet of the pre-treating chamber is configured to be connected to a first gas line and the inlet of the shielding gas chamber is configured to be connected to a second gas line, such that the gas supplied to the pre-treating chamber may be different from the gas supplied to the shielding gas chamber.

7. The welding system of claim 1, wherein the welding device comprises, within the pre-treating chamber, a wire pre-heating circuit.

8. The welding system of claim 7, wherein the wire pre-heating circuit comprises a first contact tip, a second contact tip, and a section of the wire between the first and second contact tips.

9. The welding system of claim 1, wherein the welding device comprises, within the pre-treating chamber, a wire-etching electrode.

10. The welding system of claim 1, further comprising one or more flow impingers configured to create turbulent gas flow within the pre-treating chamber.

\* \* \* \* \*